United States Patent
Richards

(10) Patent No.: US 10,645,652 B2
(45) Date of Patent: *May 5, 2020

(54) COMMUNICATIONS DEVICE AND METHODS FOR CONTROLLING STASIS STATE TRANSITION FOR A MOBILE TERMINAL

(71) Applicant: SONY CORPORATION, Tokyo (JP)

(72) Inventor: Derek John Richards, Swindon (GB)

(73) Assignee: CONVIDA WIRELESS, LLC, Wilmington, DE (US)

(*) Notice: Subject to any disclaimer, the term of this patent is extended or adjusted under 35 U.S.C. 154(b) by 3 days.

This patent is subject to a terminal disclaimer.

(21) Appl. No.: 15/874,369

(22) Filed: Jan. 18, 2018

(65) Prior Publication Data
US 2018/0160371 A1    Jun. 7, 2018

Related U.S. Application Data

(63) Continuation of application No. 14/784,656, filed as application No. PCT/GB2014/050972 on Mar. 27, 2014, now Pat. No. 9,913,218.

(30) Foreign Application Priority Data

Apr. 22, 2013 (GB) .................................. 1307186.5

(51) Int. Cl.
*G08C 17/00* (2006.01)
*H04W 52/02* (2009.01)
(Continued)

(52) U.S. Cl.
CPC ...... *H04W 52/0235* (2013.01); *G06F 21/606* (2013.01); *H04L 47/30* (2013.01);
(Continued)

(58) Field of Classification Search
CPC ................................................ H04W 52/0235
See application file for complete search history.

(56) References Cited

U.S. PATENT DOCUMENTS

2007/0191033 A1* 8/2007 Marais ..................... H04L 67/14
455/466
2008/0242224 A1* 10/2008 Fratti ..................... H04H 20/57
455/3.06
(Continued)

FOREIGN PATENT DOCUMENTS

EP    2 214 440 A1    8/2010
EP    2 557 889 A1    2/2013
(Continued)

OTHER PUBLICATIONS

European Office Action dated Oct. 9, 2018 in European Application No. 14715080.9-1219.
(Continued)

*Primary Examiner* — Gerald A Smarth
(74) *Attorney, Agent, or Firm* — Xsensus LLP

(57) ABSTRACT

A communications device establishes a communications context for communicating data packets using a packet communications bearer from the communications device via the mobile communications network. A controller of the communications device is configured to identify that the communications device can enter a stasis state because no data packets are available for transmission for a predetermined time via the packet communications bearer or there are no data packets to receive via the packet communications bearer, to transmit a stasis state message to the mobile communications network, and to store information relating to the communications context associated with the packet communications bearer in a data store. The stored information can be used by the controller to re-establish the packet communications bearer to transmit and/or receive data pack-
(Continued)

ets using the packet communications bearer, the communications device thereby entering the stasis state.

22 Claims, 13 Drawing Sheets

(51) Int. Cl.
| | |
|---|---|
| *G06F 21/60* | (2013.01) |
| *H04W 76/19* | (2018.01) |
| *H04W 76/27* | (2018.01) |
| *H04W 76/25* | (2018.01) |
| *H04W 76/28* | (2018.01) |
| *H04W 12/00* | (2009.01) |
| *H04L 12/835* | (2013.01) |
| *H04L 29/06* | (2006.01) |
| *H04W 28/02* | (2009.01) |
| *H04W 36/24* | (2009.01) |
| *H04W 68/02* | (2009.01) |
| *H04W 4/70* | (2018.01) |
| *H04W 12/02* | (2009.01) |
| *H04W 88/00* | (2009.01) |
| *H04W 88/02* | (2009.01) |

(52) U.S. Cl.
CPC ......... *H04L 63/06* (2013.01); *H04W 12/0017* (2019.01); *H04W 28/0252* (2013.01); *H04W 36/24* (2013.01); *H04W 52/0209* (2013.01); *H04W 68/02* (2013.01); *H04W 76/19* (2018.02); *H04W 76/25* (2018.02); *H04W 76/27* (2018.02); *H04W 76/28* (2018.02); *G06F 2221/2101* (2013.01); *H04W 4/70* (2018.02); *H04W 12/02* (2013.01); *H04W 88/00* (2013.01); *H04W 88/02* (2013.01); *Y02D 70/1242* (2018.01); *Y02D 70/1262* (2018.01); *Y02D 70/21* (2018.01); *Y02D 70/24* (2018.01)

(56) References Cited

U.S. PATENT DOCUMENTS

| | | | |
|---|---|---|---|
| 2008/0242292 A1 | 10/2008 | Koskela et al. | |
| 2009/0052420 A1 | 2/2009 | Fischer | |
| 2009/0059829 A1 | 3/2009 | Bachmann | |
| 2011/0249610 A1 | 10/2011 | Ho | |
| 2012/0172036 A1 | 7/2012 | Bhalla | |
| 2013/0028097 A1* | 1/2013 | Barrett | H04W 4/20 370/241 |
| 2013/0028235 A1 | 1/2013 | Barrett | |
| 2013/0039339 A1 | 2/2013 | Rayavarapu et al. | |
| 2013/0122918 A1* | 5/2013 | Boley | H04W 52/0212 455/450 |
| 2013/0260811 A1* | 10/2013 | Rayavarapu | H04W 76/19 455/509 |
| 2014/0140279 A1 | 5/2014 | Barrett | |
| 2014/0198718 A1* | 7/2014 | Billau | H04W 40/02 370/328 |
| 2015/0365994 A1* | 12/2015 | Yu | H04W 72/1268 370/336 |
| 2016/0037450 A1 | 2/2016 | Richards | |
| 2016/0302153 A1* | 10/2016 | Martin | H04W 76/28 |

FOREIGN PATENT DOCUMENTS

| | | |
|---|---|---|
| GB | 2493240 A | 1/2013 |
| GB | 2493346 A | 2/2013 |
| GB | 2493347 A | 2/2013 |
| GB | 2493722 A | 2/2013 |
| GB | 2497073 A | 6/2013 |
| WO | 2008/087524 A2 | 7/2008 |
| WO | 2012/034580 A1 | 3/2012 |
| WO | 2012/175664 A2 | 12/2012 |
| WO | 2013/017839 A1 | 2/2013 |

OTHER PUBLICATIONS

"LTE: Evolved Universal Terrestrial Radio Access (E-UTRA); Medium Access Control (MAC) protocol specification ," ETSI 3GPP TS 36.321 version 8.9.0 Release 8. Jul. 2010 (49 pages).
"LTE; Evolved Universal Terrestrial Radio Access (E-UTRA) and Evolved Universal Terrestrial Radio Access Network (E-UTRAN); Overall description; Stage 2," ETSI 3GPP TS 36.300 version 10.8.0 Release 10, Jul. 2012 (210 pages).
"LTE; Evolved Universal Terrestrial Radio Access (E-UTRA); Radio Resource Control (RRC); Protocol specification," ETSI 3GPP TS 36.331 version 11.2.0 Release 11, Feb. 2013 (345 pages).
International Search Report dated Jun. 30, 2014 in PCT/GB2014/050972 filed Mar. 27, 2014.
Great Britain Search Report dated Oct. 24. 2013 in GB1307186.5 filed Apr. 22. 2013.

* cited by examiner

State Transistions: RRC_IDLE/ECM_IDLE->
RRC_CONNECTED/ECM_DLE-> RRC_CONNECTED/ECM_CONNECTED->
RRC_IDLE/ECM_IDLE Control-plane protocol stack User-plane protocol stack Signalling for transitions: RRC_IDLE + ECM_IDLE-> RRC_CONNECTED + ECM_CONNECTED-> RRC_IDLE + ECM_IDLE State transistion diagram showing transition between
RRC_CONNECTED + ECM_CONNECTED and
RRC_NewState + ECM_CONNECTED Details of State Transitions Between RRC_CONNECTED and RRC_NewState Signalling Flows related to transition between
RRC_CONNECTED and RRC_NewState

COMMUNICATIONS DEVICE AND METHODS FOR CONTROLLING STASIS STATE TRANSITION FOR A MOBILE TERMINAL

CROSS-REFERENCE TO RELATED APPLICATIONS

The present application is a continuation of U.S. application Ser. No. 14/784,656 filed on Oct. 15, 2015, which is a National Phase of PCT/GB2014/050972 filed on Mar. 27, 2014, and claims priority to British Patent Application 1307186.5, filed in the UK IPO on Apr. 22, 2013, the entire contents of each of which are incorporated herein by reference.

TECHNICAL FIELD OF THE DISCLOSURE

The present disclosure relates to communications devices, and methods of communicating using communications devices, infrastructure equipment for mobile communications networks, mobile communications networks and systems and methods of communicating using mobile communications networks.

BACKGROUND OF THE DISCLOSURE

Mobile communications systems continue to be developed to provide wireless communications services to a greater variety of electronic devices. In more recent years, third and fourth generation mobile telecommunication systems, such as those based on the 3GPP defined UMTS and Long Term Evolution (LTE) architectures have been developed to support more sophisticated communications services to personal computing and communications devices than simple voice and messaging services offered by previous generations of mobile telecommunication systems. For example, with the improved radio interface and enhanced data rates provided by LTE systems, a user may enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

More recently it has been recognised that rather than providing high data rate communications services to certain types of electronics devices, it is also desirable to provide communications services to electronics devices that are simpler and less sophisticated. For example, so-called machine type communication (MTC) applications may be semi-autonomous or autonomous wireless communication devices which may communicate small amounts of data on a relatively infrequent basis. Some examples include so-called smart meters which, for example, are located in a customer's house and periodically transmit information back to a central MTC server data relating to the customer's consumption of a utility such as gas, water, electricity and so on.

Whilst it can be convenient for a communications device such as an MTC type device to take advantage of the wide coverage area provided by a third or fourth generation mobile telecommunication network there are at present disadvantages. Unlike a conventional third or fourth generation communications device such as a smartphone, a lower complexity device may operate with a lower bandwidth and be preferably relatively simple and inexpensive. The type of functions performed by the MTC-type device (e.g. collecting and reporting back data) do not require particularly complex processing to perform.

As will be appreciated, there may be a desire for many types of communications devices and mobile communications networks to use communications resources as efficiently as possible and to reduce power consumption. It is known for example to reduce the power consumed by a communications device by performing what is known as discontinuous reception. Discontinuous reception is a technique in which a communications device may be radio resource connected, but after monitoring a control channel to determine whether communications resources have been allocated to the communications device, the communications device can sleep for a remainder of a time before another transmission may occur on the control channel A communications device may also be configured with a short and a long discontinuous reception timer. If no activity is detected for a short discontinuous reception time, then the communications device moves to a long discontinuous reception timer. Accordingly the communications device can save power.

SUMMARY OF THE DISCLOSURE

Embodiments of the present disclosure can provide in one example a communication device for transmitting data to and receiving data from a mobile communications network. The mobile communications network includes one or more network elements providing a wireless access interface for communicating with the communications device. The communications device comprising a transmitter unit configured to transmit signals to the mobile communications network via the wireless access interface provided by the one or more network elements of the mobile communications network, and a receiver unit configured to receive signals from the mobile communications network via the wireless access interface provided by the one or more network elements of the mobile communications network, and a controller. The controller is configured to control the transmitter unit to transmit one or more signalling messages to the communications network and the receiver unit to receive one or more signalling messages from the communications network to establish a communications context for communicating data packets using a packet communications bearer from the communications device via the mobile communications network. The controller is configured to identify that the communications device can enter a stasis state because no data packets are available for transmission for a predetermined time via the packet communications bearer or there are no data packets to receive via the packet communications bearer, to transmit a stasis state message to the mobile communications network, and to store information relating to the communications context associated with the packet communications bearer in a data store. The stored information can be used by the controller using the transmitter unit and the receiver unit to re-establish the packet communications bearer to transmit and/or receive data packets using the packet communications bearer, the communications device thereby entering the stasis state.

Embodiments of the present technique can provide can arrangement in which a communications device can enter a stasis state in which a current state of protocols associated with a communications bearer for both the wireless access interface and via a mobile communications network are saved. However radio resources associated with the communications context and therefore the communications bearer are released for allocation to other communications devices. If the mobile communications device then needs to transmit or receive data for example if there are data packets to be transmitted via the mobile communications network, then the communications device can transmit a request message to transit from the stasis state to the connected state, re-establishing the communications bearer by recovering from the data store the state of the protocols of the communications bearer as defined by the communication contexts as they were saved before the stasis state. Accordingly there is a saving in both communications resources and power because the previous communications context and communications bearer has been saved and therefore does not need to be established. In contrast conventional techniques would require that the radio resources and the communications bearer are released by the mobile communications network so that the communications device would have to re-create a communications context by performing a routine which requires an exchange of messages with the mobile communications network. Accordingly there is a saving in both communications resources and power consumed by the communications device.

In a radio resource idle state, a communications device is conventionally arranged to respond to a paging message transmitted by the communications network. The occasions when it may be paged, are indicated by System Information and these must coincide with the OnDurationTime of RRC_CONNECTED discontinuous reception so that the communications monitors control channels such as the PDCCHs in order to detect a paging identifies such as a P-RNTI. As such, in some examples the communications device may be configured to move out from the stasis state into the connected state in order to receive downlink data packets after receiving a paging message.

Further aspects and features of the present disclosure are defined in the appended claims, including but not limited to, a mobile communications device, a method of communicating, a network infrastructure element, a communications network and the method of communicating via a wireless access interface.

BRIEF DESCRIPTION OF DRAWINGS

Embodiments of the present disclosure will now be described by way of example only with reference to the accompanying drawings in which like parts are provided with corresponding reference numerals and in which.

DESCRIPTION OF EXAMPLE EMBODIMENTS

The example embodiments will be generally described in the context of a 3GPP LTE architecture. However, the invention is not limited to an implementation in a 3GPP LTE architecture. Conversely, any suitable mobile architecture is considered to be relevant.

Conventional Network

Figure 1:
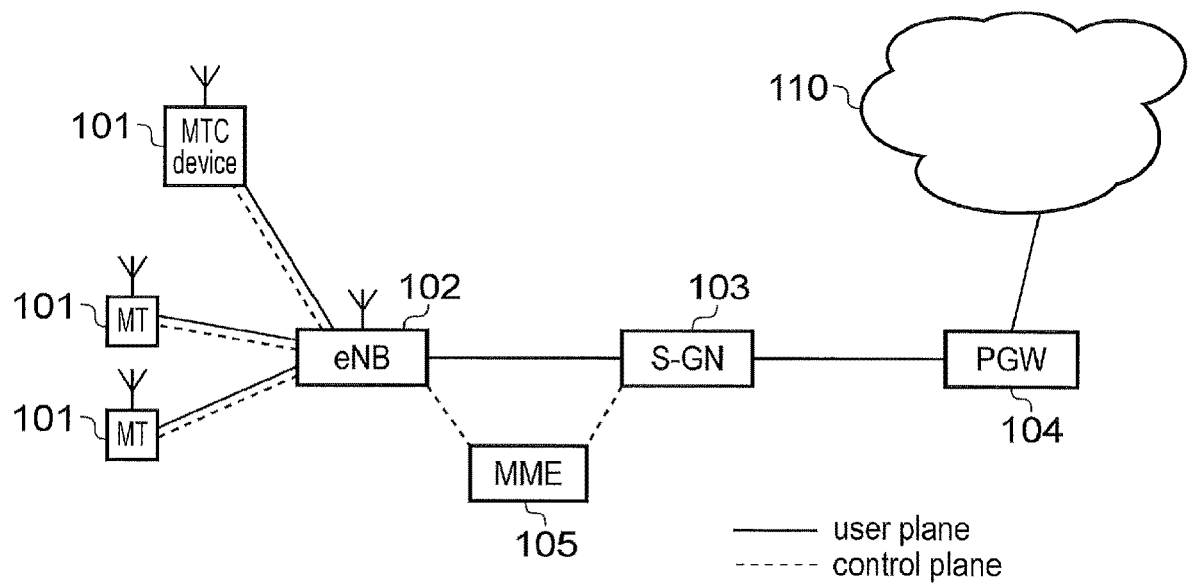
FIG. 1 provides a schematic diagram illustrating an example of a mobile communications network configured in accordance with LTE.

FIG. 1 provides a schematic diagram illustrating the basic functionality of a conventional mobile telecommunications network. The network includes one or more base stations 102 (one base station represented) connected to a serving gateway (S-GW) 103 for traffic in the user plane and to a Mobility Management Entity (MME) for signalling in the control plane. In LTE, the base stations are called e-NodeB, which are referred to in the following description as eNB. Each base station provides a coverage area 103 within which data can be communicated to and from communications devices 101. Data is transmitted from a base station 102 to a communications device 101 within a coverage area via a radio downlink. Data is transmitted from a communications device 101 to a base station 102 via a radio uplink. The core network, comprising the MME 105, the S-GW 103 and the PDN-Gateway (P-GW) 104, routes data to and from the communications devices 101 and provides functions such as authentication, mobility management, charging and so on. The P-GW is connected to one or more other networks, which may for example include the internet, an IMS core network, etc. In the illustration of FIG. 1, connections on the user plane have been represented with a plain line while connections on the control plane have been represented with a dashed line.

The term communications devices will be used to refer to a communications terminal or apparatus which can transmit or receive data via the mobile communications system. Other terms may also be used for communications devices such as personal computing apparatus, remote terminal, transceiver device or user equipment (UE) which may or may not be mobile.

Figure 2:
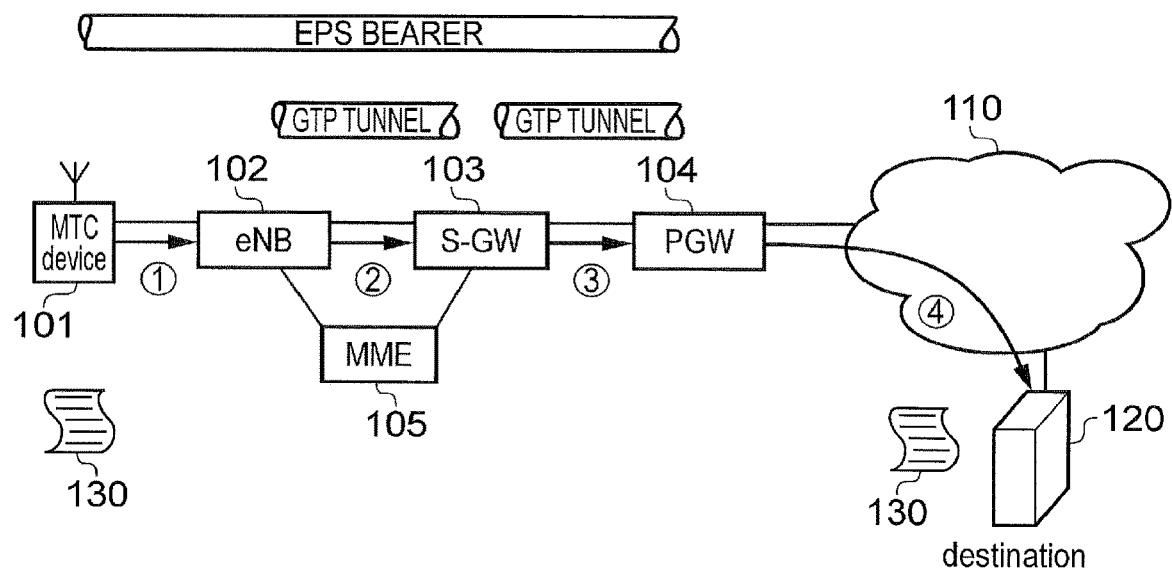
FIG. 2 provides a schematic diagram illustrating an arrangement of an Enhanced Packet Service bearer established for communicating data packets via the mobile communications network.

FIG. 2 illustrates an example of a path followed by a message 130 communicated by a communications device 101. In that example an MTC communications device 101, wishes to send the message 130 to a destination 120, the destination being reachable via the internet. In this example, a destination device is represented as a computer. However the destination 120 could be an element of any suitable type where the element can be addressed by the communications device 101. For example, the destination device 120 may be another communications device, a personal computer, a server, a proxy, or an intermediary element (to a final destination).

The following description provides a summary explanation of an example of operation in which a communications device communicates the message 130 via an LTE network, which is helpful in appreciating some aspects and advantages of the present technique.

In order for the communications device 101 to send data to a destination, an EPS bearer between the communications device 101 and the PGW 104 is set up, the EPS bearer being partially carried over a GTP tunnel between the eNB 102 and the SGW and another GTP tunnel between SGW and PGW 104, as illustrated in FIG. 2. As the message 130 is carried to the destination device, it is sent from the communications device 101, at a first end of an EPS bearer to the eNB 102 (step 1), then to the S-GW 103 (step 2) and then to the P-GW 104 (step 3), at the other end of the EPS bearer. The P-GW 104 then forwards the message 130 to the destination 120 (step 4).

Figure 3:
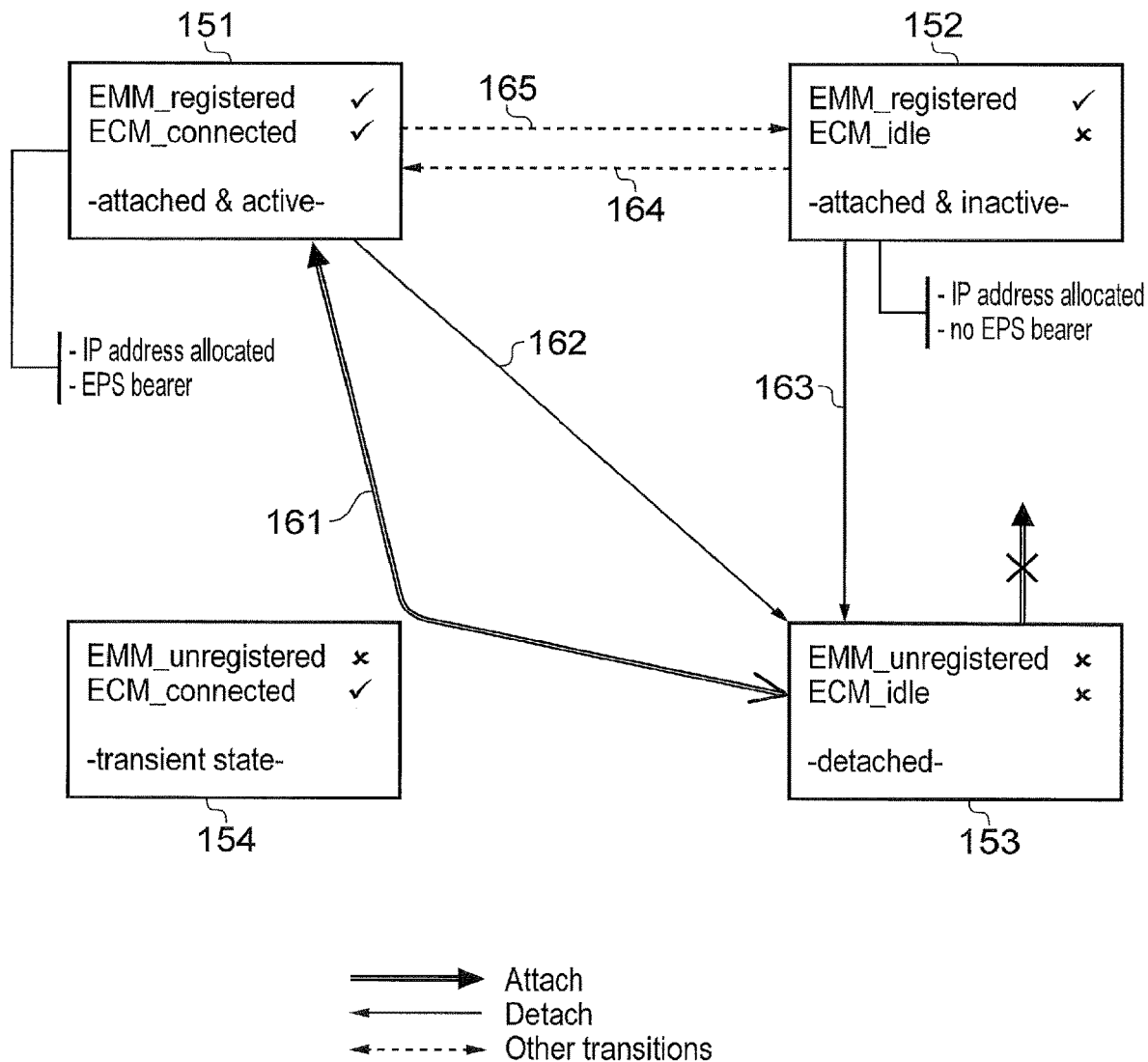
FIG. 3 provides a schematic diagram representing the states of the communications device including whether the device is EMM registered or ECM connected.

FIG. 3 illustrates the various transitions between the four possible combinations of ECM states (connected or idle) and EMM states (registered or unregistered) as defined in the LTE standards for a communications device with a view to illustrating how communications devices' connections are managed. The acronym ECM stands for "EPS Connection Management" and the ECM state generally indicates whether the communications device has a Non-Access Stratum (NAS) connection set up with the MME. In LTE, as the communications device connects to the MME and switches to ECM_connected, it also sets up an EPS bearer, that is, a data connection to the P-GW via the S-GW. Also, as the communications device switches from ECM_connected to ECM_idle, the EPS bearer is torn down, and all S1 and RRC connections are released. The acronym EMM stands for "EPS Mobility Management" and the EMM state generally indicates whether a communications device is attached to the network. When the communications device is in EMM_unregistered, it may for example be turned off, out of coverage or connected to a different network. In contrast, when a communications device is in EMM_registered, it is attached to the network and, as such, it has an IP address and a NAS security context in the MME. It may or may not have an EPS bearer set up, but in any case, it has some context associated with it in the MME (e.g. NAS security context) and in the P-GW (e.g. the IP address). In addition the MME will know in which tracking areas the UE is located. The four ECM/EMM states and the transitions between them is described next.

The communications device 101 is assumed to start from a state 153 in which the communications device 101 is not connected to the network. In the state 153, the communications device is in EMM_unregistered and ECM_idle states. From this state, the communications device can attach to the network to be in EMM_registered and ECM_connected states. However, in order to attach, the communications device cannot switch to EMM_registered if it has not switched to ECM_connected first. In other words, starting from state 153, the communications device cannot go to states 152 or 151 and it has to go to state 154 first. Therefore, as illustrated by arrow 161, a communications device in state 153 can attach to the network by first switching to ECM connected and then to EMM_registered. As a communications device starts an attachment procedure from state 153, the communications device moves from a state 153 where it does not have any connection to a state 151 where it has a NAS connection to the MME, an IP address allocated by the P-GW, and a EPS bearer to the P-GW via the e-NB and the S-GW.

Transitions between states 151 and 152 occur when a data connection (EPS bearer) is set up (164) or when all data connections have been released (165). Generally, transition 165 occurs when the user had an EPS bearer active and has not been using the bearer for a certain time. The network can then decide that the communications device no longer needs an EPS bearer and thus release all the corresponding resources and switch the communications device to ECM_idle. Transition 164 generally occurs when the communications device has not been using any EPS bearer (see for example the discussion on transition 164) and now has data to send or receive. An EPS bearer is then set up for this communications device and it is switched to ECM_connected. Whenever the communications device is EMM_registered, regardless of the ECM states, the communications device will have an IP address that can be used to reach the communications device, in other words an IP context remains active even if no actual EPS bearer is currently active (e.g. state 152).

If the communications device detaches from the network, for example because it is turned off, moving to a different network, or for any other reason, it will switch from any state it is into state 153, releasing any outstanding EPS bearer or context that was previously maintained for the communications device, via transitions 162 or 163.

As can be understood, the state 154 where the communications device is in ECM_connected and in EMM_unregistered is a transient state and the communications device does not generally remain in that particular state. A communications device in that state is either a communications device switching from state 153 (detached and inactive) to state 151 (attached and active) or a communications device switching from state 151 to state 153.

RRC states are also provided to reflect the status of the RRC connection between the communications device and the eNB (RRC_connected and RRC_idle). Under conventional operation conditions, the RRC states correspond to the ECM states: if the communications device is in ECM_connected, it should also be in RRC_connected and if it is in ECM_idle, it should also be in RRC_idle. Discrepancies between ECM and RRC states may occur for a short period of time as a connection is being set-up or torn-down. An illustration of the states of a communications device 101 which include both the ECM states and the RRC states is illustrated in FIG. 4.

Figure 4:
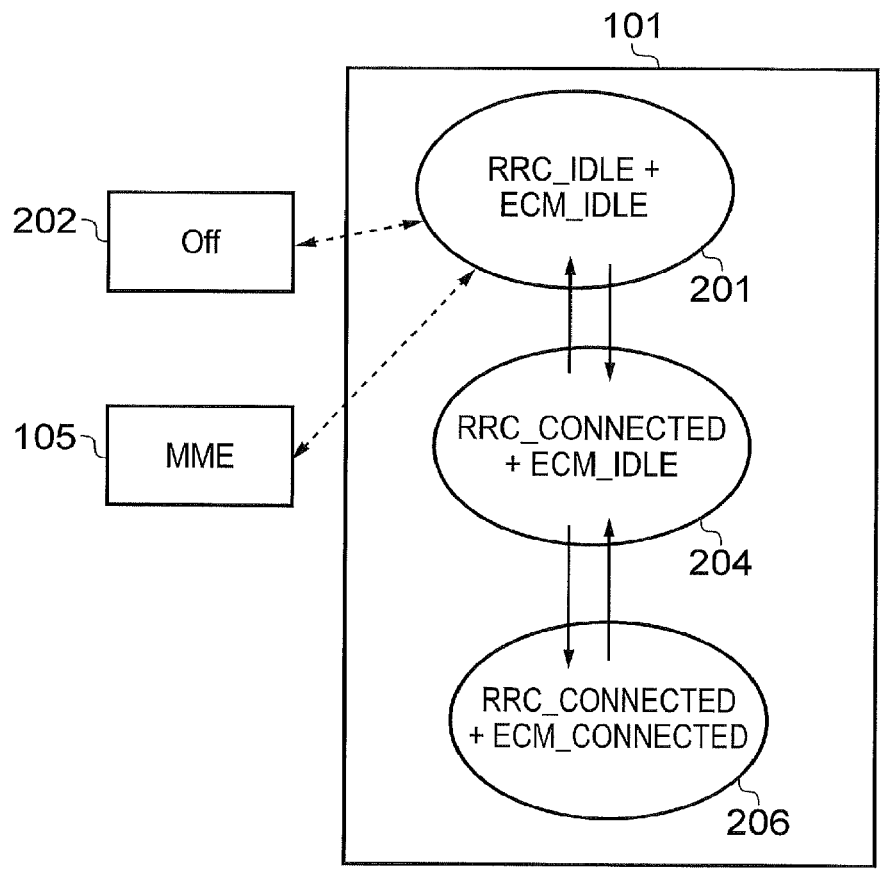
FIG. 4 is a schematic illustration of state transitions of a communications device operating in the mobile communications network of FIG. 1.

As shown in FIG. 4 a communications device 101 may start in the RRC Idle/ECM Idle state when the device is off and not being used by the user. The off state is therefore represented by a box 201. As soon as the communications device 101 is activated it must connect to the MME 105 in order to perform a tracking area update and to active services to the communications device. Accordingly, the communications device moves into an RRC connected state 204 but with the ECM Idle state because an EPS bearer has not yet been established. It is only after an EPS bearer has been established that the communications device 101 moves into an RRC connected and ECM connected state 206. A general illustration of the process by which data is communicated via an EPS bearer after a UE moves from an off state to an ECM connected and RRC connected state this shown in FIG. 5.

Figure 5:
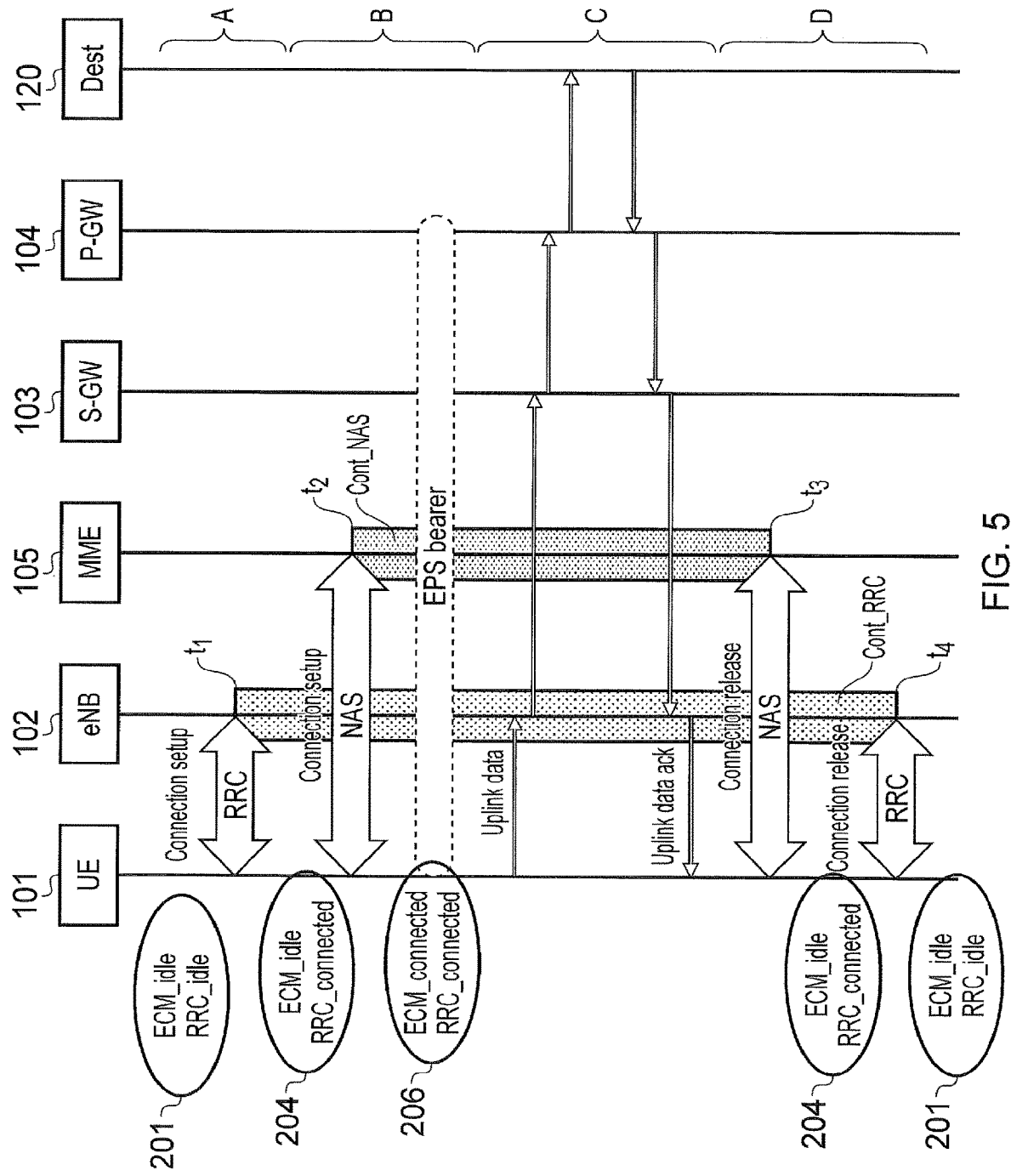
FIG. 5 is a simplified call flow diagram illustrating a process in which a communications device establishes and an EPS bearer for communicating data via the mobile communications network shown in FIG. 1.

FIG. 5 illustrates an example of the messages exchanged for setting up a connection from the communications device 101 to the destination 120, for using the connection to communicate data and for releasing the connection after the communications between the communications device 101 and the destination 120 have been completed. The call flow of FIG. 5 can be schematically divided into four steps A-D. Before step A starts, the communications device 101 is in the ECM_idle state which means that the communications device 101 is not currently communicating. At step A (messages 1-3) an RRC connection is set up between the communications device 101 and the eNB 102 for controlling communications between the communications device 101 and the eNB 102. Once this RRC connection has been successfully established, at step B (messages 3-12), the communications device 101 can establish a NAS connection with the MME 105. Following this NAS connection request from the communications device 101 to the MME 105, the MME sets up a connection (e.g. EPS bearer) between the communications device 101 and the P-GW 104, via the S-GW 103 and the eNB 102, and controls this connection. Although they have not been represented here, messages may also be sent to the P-GW 104, for example from the S-GW 103, for setting up the connection (e.g. EPS bearer) at the P-GW 104, for example the GTP tunnel and EPS bearer. At the end of step B, the communications device 101 has an EPS bearer set-up and available to send and receive messages and is therefore in the ECM-connected state. The call flow of FIG. 4 is an illustration and some of the messages may vary, for example depending on the EMM state before step A. For example, the communications device may be in EMM_unregistered state and switch to EMM_registered during step B, or may already be in EMM_registered before step A starts.

During step A, a RRC connection is setup between the communications device 101 and the eNB 102. Once this RRC connection has been set up, at time $t_1$, the eNB maintains an RRC context, referred to as Cont_RRC, for the duration of the RRC connection. In other words, until the RRC is released, the eNB will maintain this Cont_RRC. Such a context may for example include a communications device identifier (e.g. C-RNTI), power control settings, mobility settings, security settings, other radio settings or any other information. There will also be a corresponding context in the UE storing similar information pertaining to the operation of the radio layers, however, this is not shown in the diagram.

Once the RRC connection has been set up, a NAS connection is set up between the communications device 101 and the MME 105. Once this NAS connection has been set up, at time $t_2$, the MME 105 maintains a context for this NAS connection to the communications device 101, referred to as Cont_NAS, for the duration of the NAS connection. Such a NAS context may for example include a terminal identifier, a terminal's IP address, a current eNB, mobility settings, security settings, QoS settings, or any other information. As explained above, when the communications device 101 attaches/sets up a data connection via the mobile network, an EPS bearer is set up in the user plane between the communications device and the P-GW 104, the bearer being controlled in the control plane by the MME 105. There will also be a context in the UE storing UE related information pertaining to the NAS protocol. Note that the context Cont_NAS shown in the diagram as being stored at the MME, may include more information than just that used by or transferred in EPC NAS signalling procedures, it may also contain information pertaining to the session which has been gathered by the MME from for example, an HSS.

Once the RRC connection, the NAS connection and the EPS bearer have been set up, the communications device can send uplink data through the EPS bearer and to the destination. Even though in the example of FIG. 5, the communications device 101 sends uplink data, the same connection setup would occur for a downlink or for an uplink and downlink transmission. Likewise the path of an acknowledgement message has been illustrated in the example of FIG. 5 even though there may not be any acknowledgement message in other examples. As discussed earlier, this may for example be dependent upon the type of protocol(s) used for transmitting the data.

As can be seen in FIG. 5, Cont_RRC and Cont_NAS are maintained for the duration of the RRC and NAS connection (i.e. until they are expressly released with a connection release message exchange) and, as a result, the RRC context is used for every packet that eNB 101 receives from or sends to the communications device 101. Once the EPS bearer can be released, the NAS connection between the communications device 101 and the MME 105 is released at the same time. As a result, at the time $t_3$ where the NAS connection is released, the context Cont_NAS is also released. The tearing down of the NAS connection is followed by a tearing down of the corresponding RRC connection at time $t_4$. Again, as the RRC connection is released, the context Cont_RRC is also released.

At a point in time after completion of step C, the resources are released (step D). Step D could happen at any time after step C, for example just after message 20, or at a later point in time, for example after the communications device 101 stopped communicating for a predetermined time. The aim of step D is to release all unused connections, that is, to release the NAS connection between the MME 105 and the communications device 101 (also leading to the release of resources such as the GTP tunnel between S-GW and eNB and the EPS bearer), and to release the RRC connection between the communications device 101 and the eNB 102. Again, depending on whether the communications device 101 should remain in EMM_registered after step D or should switch to EMM_unregistered, the call flow for step D is likely to be affected. For example, the communications device 101 may remain in EMM_registered if the communications device simply releases the RRC connection, NAS connection and EPS bearer because it has been inactive for too long, or the communications device 101 may de-attach from the network and switch to EMM_unregistered (for example following a handover to a GSM network).

Protocol Stack within Network Elements

Figure 6:
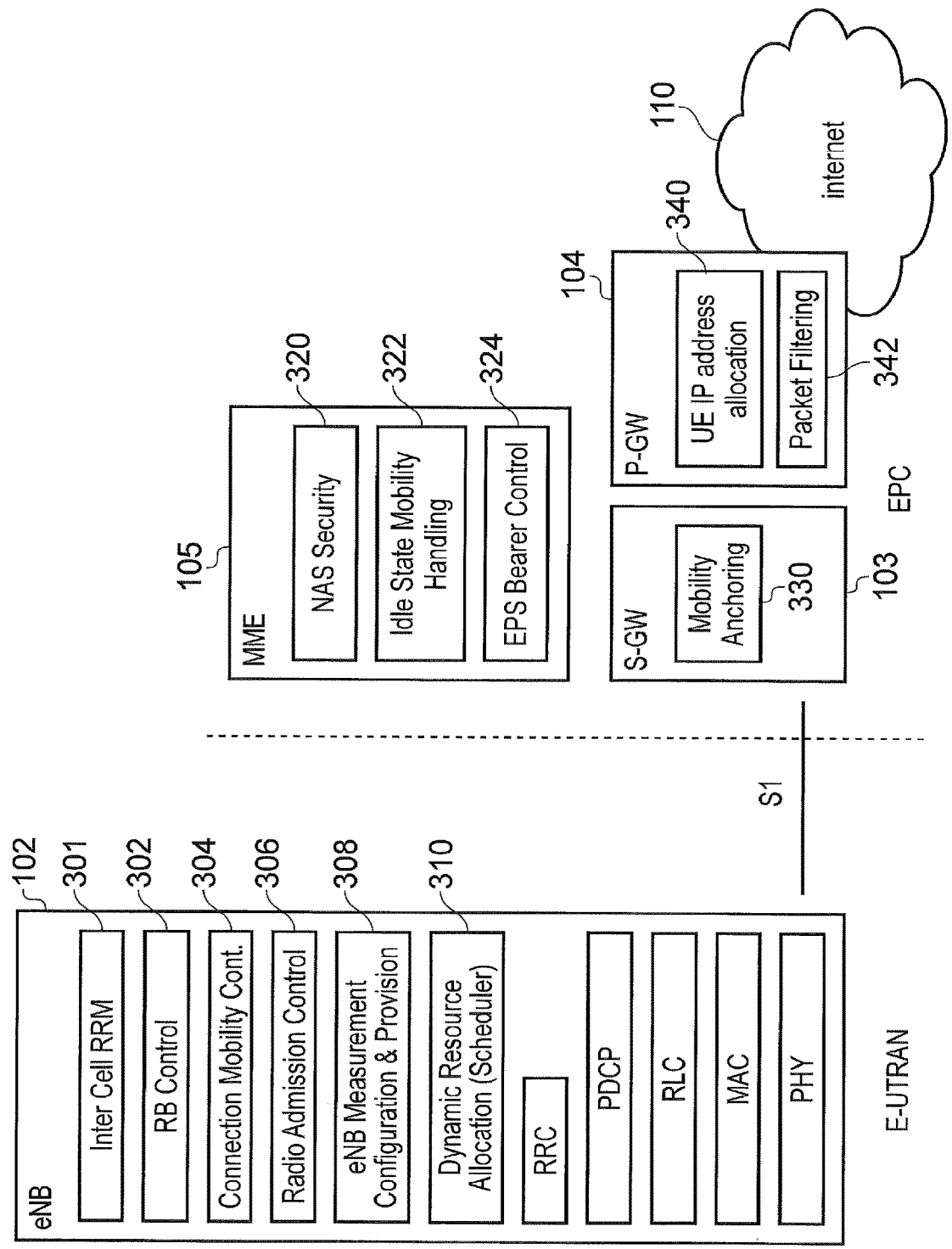
FIG. 6 is a schematic block diagram illustrating functions performed by infrastructure equipment of the mobile indications network shown in FIG. 1 to provide an EPS bearer.

As will be appreciated from those skilled in the art each of the network elements shown in FIG. 5 performs various functions in order to establish the EPS bearer and allow the communications device 101 to move from the EPM and RRC Idle states to the ECM connected and RRC connected states. This is achieved using various functions performed at each of the different protocol layers in both a user plane protocol stack and a control plane protocol stack. The functions performed by each of the network elements are shown in FIG. 6. As shown in FIG. 6 the eNodeB 102 includes and intercell radio resource management entity 301, a radio bearer controller 302, a connection management controller 304, a radio admission control 306, an eNodeB measurement configuration and provision entity 308 and a dynamic resource allocation or scheduler 310 which operate for example as explained in 3GPP document TS36.300 to provide radio resources to the communications device and to manage the connection and mobility. In respect of the control plane signalling the MME communicates signalling messages to the eNodeB 102 using an NAS security function 320, an Idle state mobility handling 322 and an EPS bearer controller 304. Control plane functions or NAS functions performed by the serving gateway include mobility anchoring 330 as well as UPI address allocation performed by the P-GW 104 340 and packet filtering 342.

Figure 7:
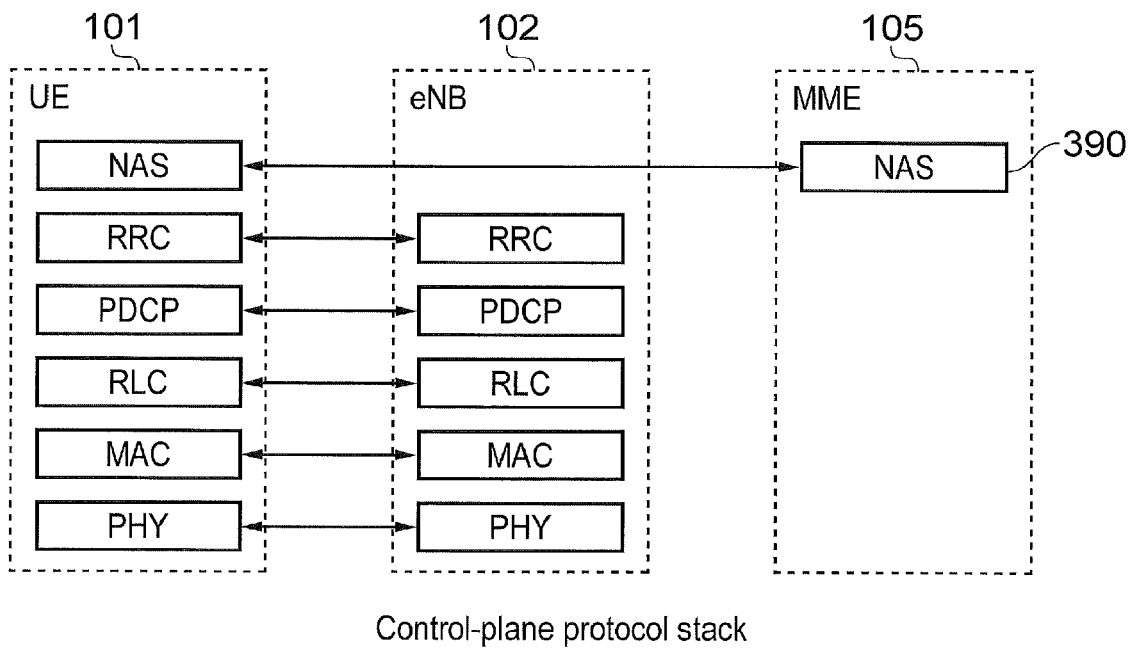
FIG. 7 is a schematic block diagram illustrating the protocol stack for a control plane of infrastructure equipment forming part of the mobile communications network shown in FIG. 1.

Correspondingly the protocol stack for the control plane entities illustrated in FIG. 7 which facilitate the non access stratum (NAS) signalling is supported by a protocol stack which includes a relay resource connection layer 400, a packet data conversions protocol layer 402, a radio link control layer 404, a medium access control layer 406 and the physical layer 408.

Figure 8:
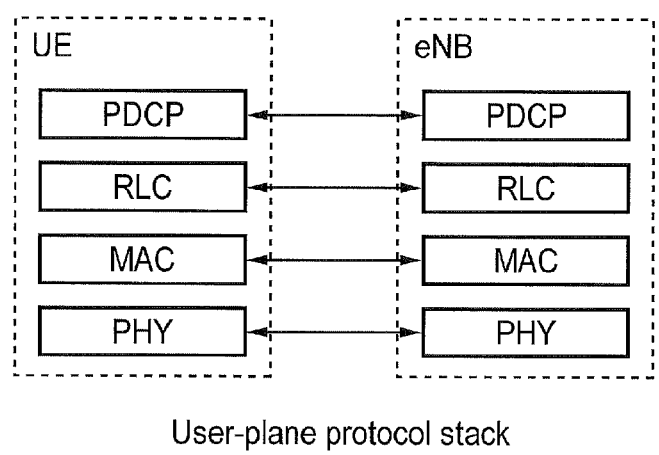
FIG. 8 is a schematic block diagram illustrating the protocol stack for user plane of a communications device (UE) and is a base station (eNB)

In contrast the user plane protocol stack is showing in FIG. 8 where corresponding elements showing in FIG. 7 are correspondingly labelled.

As will be appreciated by those skilled in the art, each of the layers in the protocol stack of the user plane and the control plane are required to monitor the current state of the transmission of data at each of the protocol layers in order to maintain for example security and data delivery to form the EPS bearer for communicating packet data from the communications device 101 across the mobile communications network to the destination 120.

Stasis State

In the event that the communications device 101 has to send and/or receive large amount of data, the connection method described above can be efficient in setting up a high-throughput connection to the P-GW for transmitting such data. It is however based on the exchange of a large number of signalling messages between different parties and the setup of a large number of advanced connections (RRC, NAS, EPS, etc), which may render the system inefficient if the communications device's transmission is actually a brief and small transmission, which is likely to be the case for low complexity applications and more simple devices such as an MTC type applications. Such devices are likely to require reduced functionality in comparison to conventional communications devices, in order to reduce the cost of producing such devices. This is because it is envisaged that such devices will be more ubiquitous and utilitarian than conventional communications devices and therefore should be less expensive to produce in order to be attractive to use mobile communications networks to transmit and receive data. However the present disclosure is not limited to such devices and may find applications operating with conventional devices in a different mode. Accordingly, the present technique aims to provide an advantage of adapting conventional mobile communications techniques, particularly in respect of data communications in order to reduce an overhead of signalling transmissions and processing with respect to useful data transmitted and a cost of implementing communications devices which use the techniques as provided by an adapted mobile communications network. This is because recent networks, including LTE networks, have been designed for high-capabilities and high-mobility communications devices and, as a result, they usually provide for the setup of a high-speed high-reliability connection with an advanced mobility management with a view to supporting communications devices potentially transmitting large amount of data while moving. However, in the case of a communications device that is not moving as much as a personal phone and/or transmits only small amount of data on a relatively infrequent basis, the amount of signalling and of mobility tracking required for the communications device to communicate may be excessive. In particular, it may be excessive compared to the sometimes low level of service that may be acceptable for this type of communications devices. For example MTC communications devices are more delay-tolerant than a human-to-human communications device, are less likely to move and/or to change cell during transmissions and usually send or receive small amount of data.

It may therefore be desirable to provide ways to improve an efficiency of the network for transmitting small messages and/or MTC communications. One example is disclosed in our co-pending UK patent applications numbers 1113145.5, 1113144.8, 1209526.1 and International patent application number PCT/GB2012/051764 the contents of which are incorporated herein by reference.

According to the present technique embodiments of the present disclosure are arranged such that a mobile communications device which no longer has data to send for a predetermined time enters a stasis state by transmitting a signal to the mobile communications network and more particularly in the present example to an eNodeB 102. Once the eNodeB 102 receives the stasis message then in order to avoid having to perform all of the signalling required to set up an EPS bearer again, the current state of each of the protocol stacks for the current EPS bearer are saved by the eNodeB and other network elements. Accordingly, for example the communications device 101 retains the connection identifier which is used by the network to support the RRC connection and ECM connection state such as for example the CRNTI.

Figure 9A:
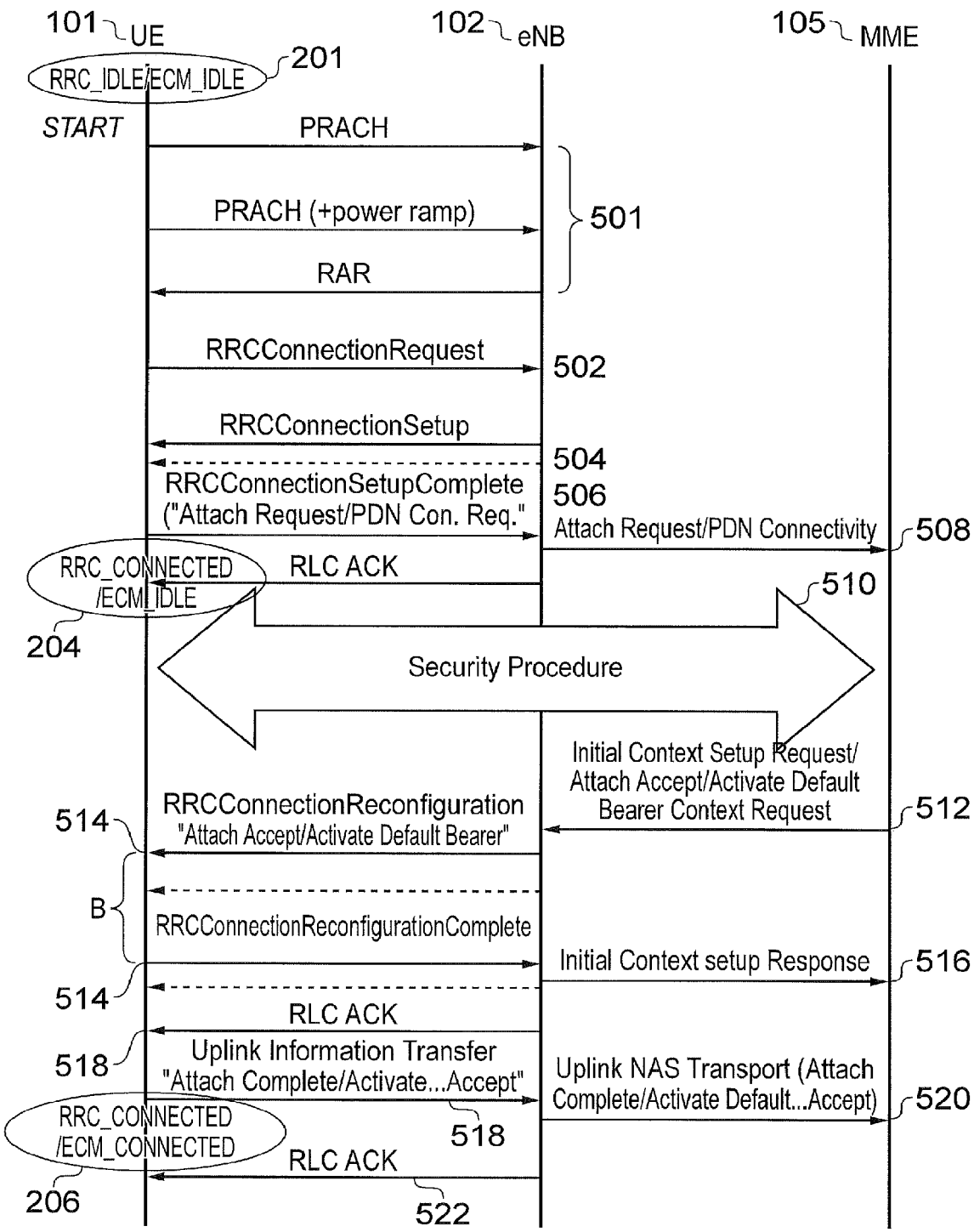
FIG. 9a is a call flow diagram illustrating an exchange of signalling messages between a communications device and infrastructure equipment of the mobile communications network shown in FIG. 1 to establish a communications context.
Figure 9B:
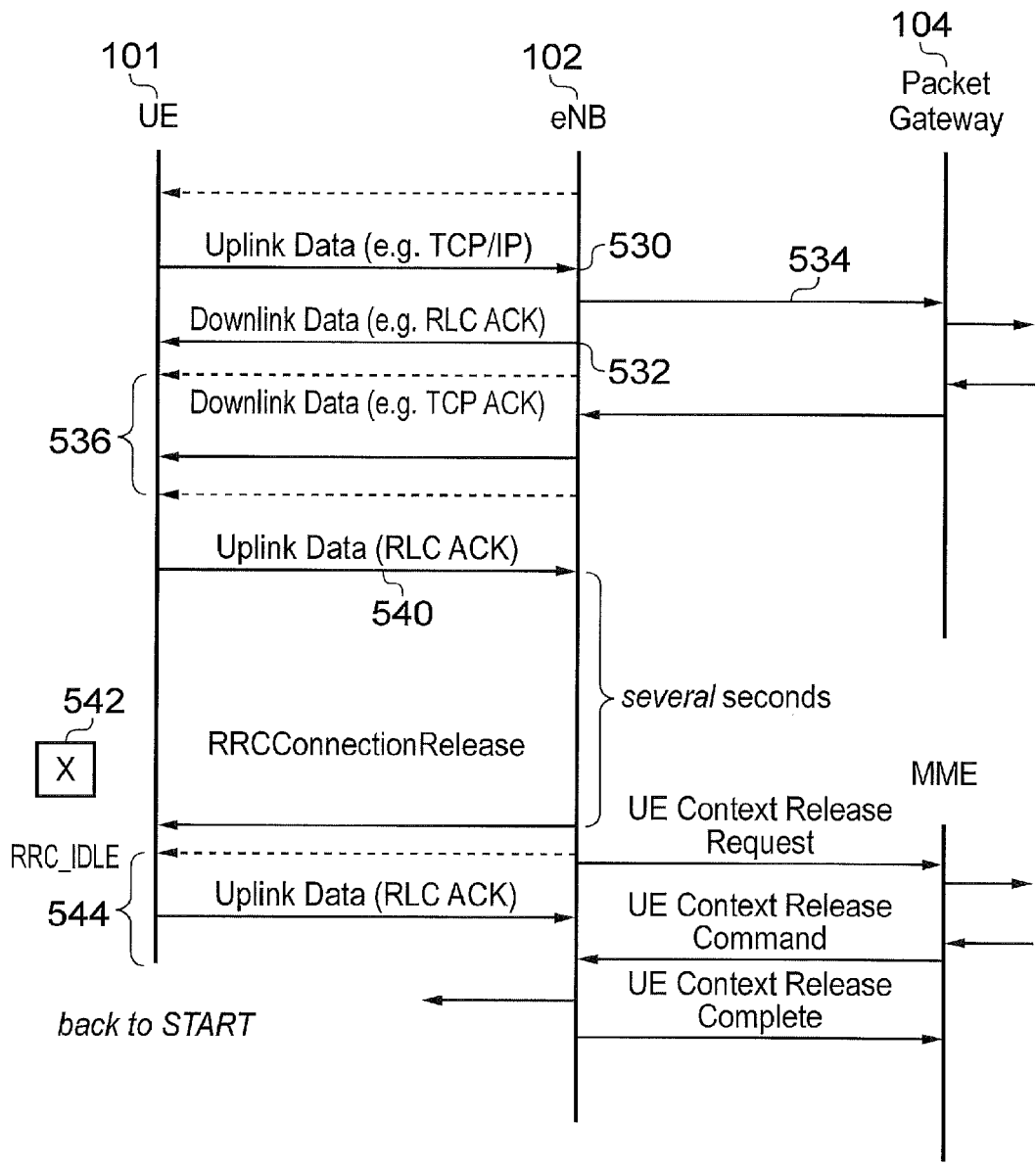
FIG. 9b is a corresponding call flow diagram illustrating an exchange of messages to release communications resources.

Embodiments of the present technique will be illustrated with reference to a more detailed call flow diagram corresponding to the example showing in FIG. 5. FIGS. 9a and 9b illustrate signalling transitions and messages which are required for the communications device 101 to pass from an RRC Idle and ECM Idle state to an RRC connected and ECM connected state back to the ECM Idle and RRC Idle state. In FIG. 9a from a start state, in which the communications device 101 is in the RRC Idle and ECM Idle state 201, the communications device 101 performs a random access procedure 501 in order to request and be granted uplink resources in order to transmit an RRC connection request message 502. The eNode-B 102 responds with a RRC connection set up message 504 and an RRC connection set up complete message. At this point the communications device 101 is in the RRC connected but ECM Idle state. Following the RRC connection set up complete message, the communications device 101 transmits an attach request/PDM connection request to the eNode-B 102 506. The eNode-B 102 then forwards the attached request/PDN connectivity message 508 to the MME 105 in order to establish an EPS bearer. Following transmission of the attached request/PDM connectivity request 508 the MME 105 and the eNodeB 102 and the communications device 105, 102, 101 perform a security procedure 510 in order to authenticate the communications device. After this process a context is established for the communications device for the EPS bearer. Accordingly, the MME 105 transmits an initial context set up request/attach accept, activate default bearer context request 512 to the eNodeB 102 which then forwards an RRC connection reconfiguration or attach accept/active default bearer message 514. The communications device 101 then transmits an RRC connection reconfiguration complete message 514 and in response the eNodeB 102 transmits and initial context set up response message 516 to the MME 105. The eNodeB 102 transmits an RLC Ack message 518 to the communications terminal 101. The communications device 101 then transmits an uplink information transfer attach complete/active accept message 518 which prompts the eNodeB 102 to transmit an uplink NAS transport (attach complete/active default accept message 520). After this message the eNodeB 102 transmits an RLC Ack message 522 at which point the communications device moves to the RRC connected/ECM connected state 206.

FIG. 9b shows the message flow for moving from the RRC connected and ECM connected states to the RRC Idle and ECM Idle states corresponding the call flow diagram showing in FIG. 9a. As shown in FIG. 9b the communications device 101 is transmitting uplink data using transmission messages 530 which are acknowledged by the eNodeB 102 with a downlink data message 532 providing an RLC Ack. The data transmitted on the uplink to the eNodeB 102 is then forwarded to the PGN 104 via the established EPS bearer 534. It then follows a TCP Ack transmitted on the downlink and messages associated with a transmission of acknowledgement of downlink data transmissions 536. After the communications terminal 101 has transmitted an uplink data RLC acknowledgement message 540 which could be the final data transmission for the uplink by the communications device 101, the communications device 101 may determine that there is no more data to send as represented by the box X 542. Only the eNodeB (communication device 102) can release the RRC connection, provided for the communications device 102, using an RRC connection release message by detecting a period of inactivity. Releasing the RRC connection will normally be the context at the eNodeB and MME (however this is dependent on network implementation). This release follows and exchange of messages 544 to release the RRC connect and also release the communications context of the communications terminal 101 using messages exchanged between the eNodeB and the PGW 104.

Figure 10:
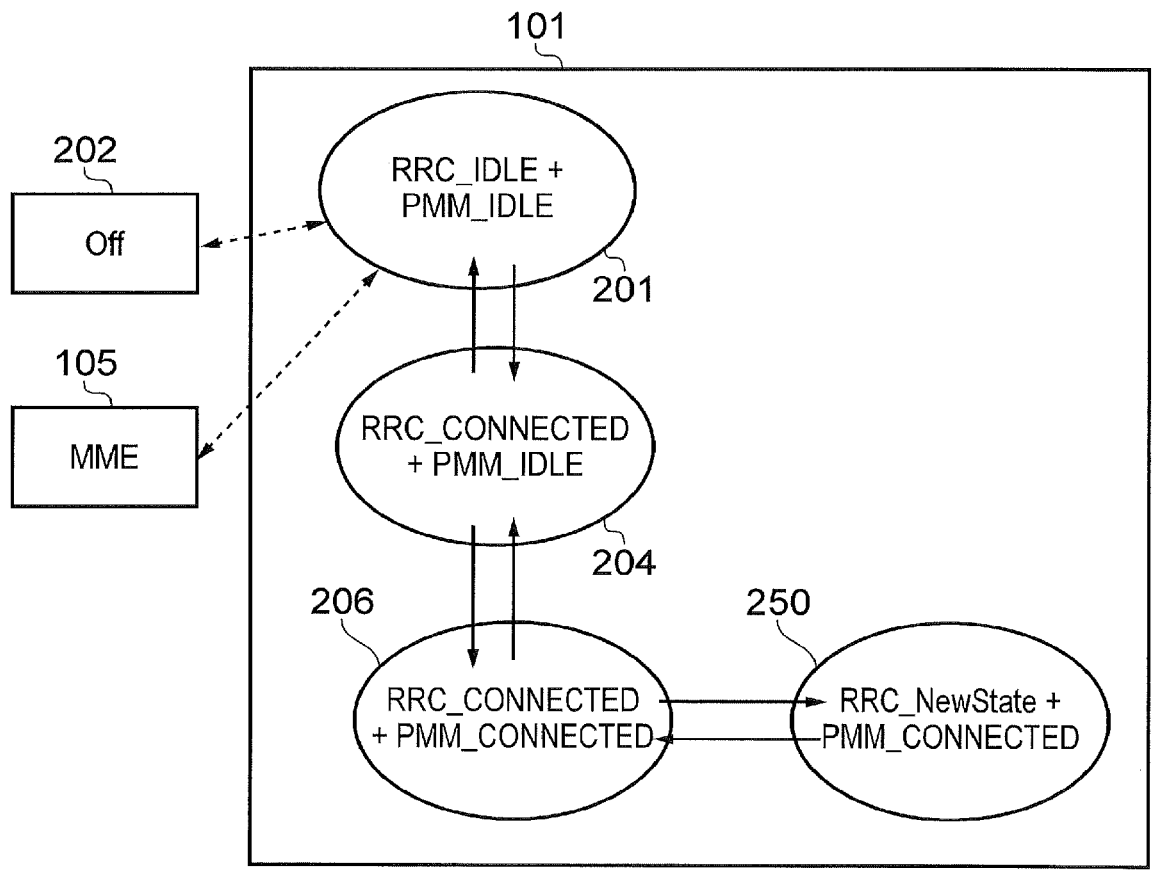
FIG. 10 is a schematic illustration of a state diagram of a communications device operating in accordance with the present technique which includes a new stasis state.

FIG. 10 provides an example of the present technique in which the communications device 101 includes a new stasis state for the RRC state. Thus as shown in FIG. 10 which corresponds to FIG. 4, a new stasis state 250 is provided to an adapted communications device 101. As explained above in the new stasis state the state of the protocols within the protocol stack on both the eNode-B 102 and the UE 101 are effectively frozen and stored and the C-RNTI for the UE is saved by the eNodeB pending further communications. However, the radio resources are released.

Figure 11:
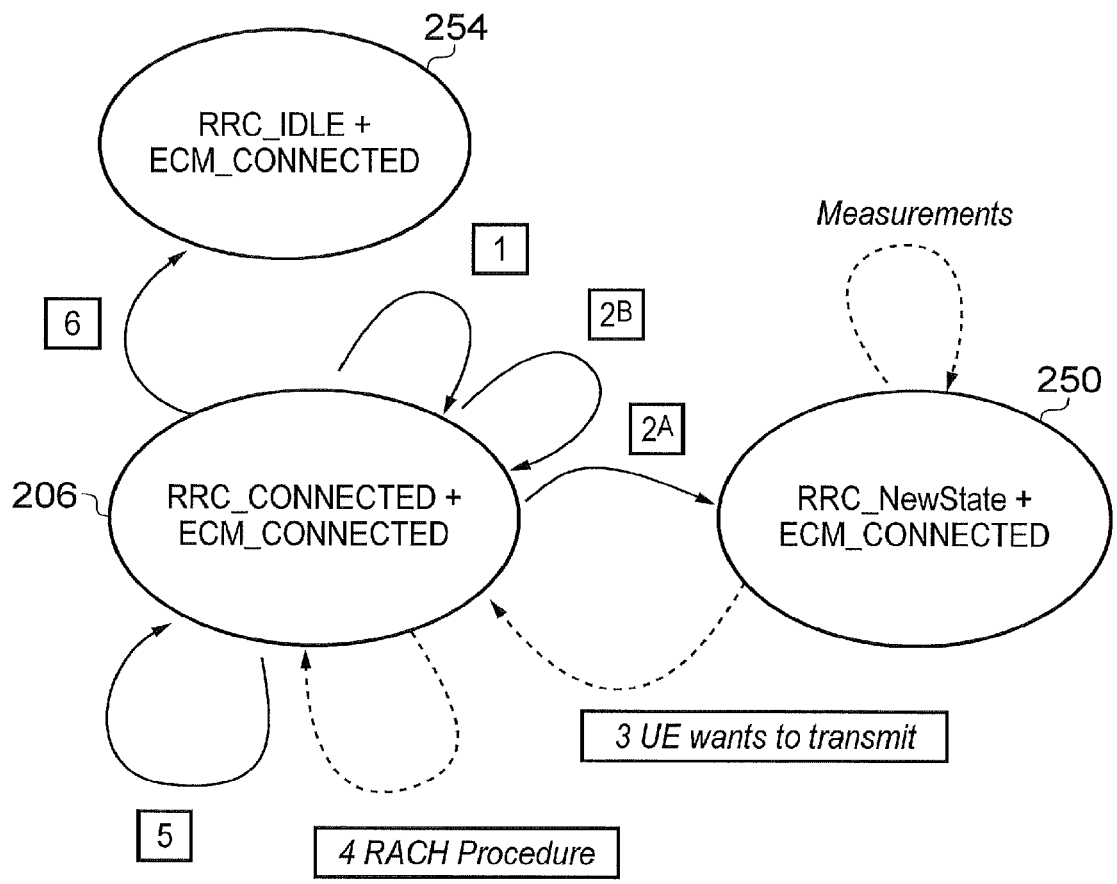
FIG. 11 is a schematic illustration of state transition diagram of a communications device which transitions to a stasis state in accordance with the present technique.

A state diagram showing the changes of the state by the communications device to reach the stasis state 250 is shown in FIG. 11, where the states are numbered in correspondence with those of FIGS. 4 and 10. The message state flow is summarised with respect to the numbering of the state transitions shown in FIG. 11 as follows:

1. A communications device determines that either it has no more data to transmit on the uplink to the communications network or that it does not expect to receive any further data on the downlink. In the former case the communications device will monitor the data buffer containing packet for transition on the uplink. In the latter case if the communications device detects that there are no more data packets to send to the communications device 101 then this may be signaled to the communications 101. The point at which the communications device therefore decides that it has no more requirements for communications resources is identified with the point "x" in FIG. 9b. In order to enter the RRC stasis state 250, the communications device 101, whilst in the RRC connected and ECM connected state 206, transmits an RRC stasis request message in state 206 before it can transition to the RRC stasis and ECM connected state 250.

2a. The communications device then receives and RRC stasis confirm message and moves from the RRC connected/ECM connected state 206 to the RRC stasis and ECM connected state 250.

2b. In some circumstances the communications device 101 may receive an RRC stasis reject message from the communications network, for example where the communications network finds that it now has data to send to the communications device or if the stasis mode for both the eNode-B and the communications device is not supported by the mobile communications network.

3. The communications device then decides that it should transmit data for example, as a result of new data being ready to be transmitted in the device's packet data buffer. Thus having received a packet for transmission the communications device needs to move back to the RRC connected and ECM connected state 206. Another reason for moving back to the RRC connected and ECM connected state 206 is that measurements performed by the communications device might indicate that it should hand over to another eNode-B in which case a communications device must be in the RRC and ECM connected state 206.

4. The communications device initiates the RACH procedure for example the MAC layer transmission described in section 5.1.5 of TS36.321. This essentially involves transmitting random access message using contention access as it conventionally arranged with mobile communications network. The PRACH includes the CRNTI which was previously stored by the communications device and by the eNodeB 102. As such when the eNodeB receives the CRNTI of the communications device in the PRACH message the eNodeB can immediately recognise that the communications device transmitted the PRACH message and also recognised that the communications device 102 concerned is currently in the stasis state 250. The eNodeB therefore moves the communications device back to the RRC connected ECM_connected state 206 and transmits an RRC connection re-establishment request message to the communications device 101.

5. Therefore on completion of the RACH procedure (RAR received) communications device transmits the RRC connection re-establishment request message to the eNodeB 102. On receipt of the RRC connection of establishment message the communications device has then successfully re-established the RRC connection and moves to the RRC connected/ECM connected state 206.

6. If the communications device receives an RRC connection re-establishment reject message then a communications device transitions back to the RRC Idle but ECM connected state 252.

Figure 12:
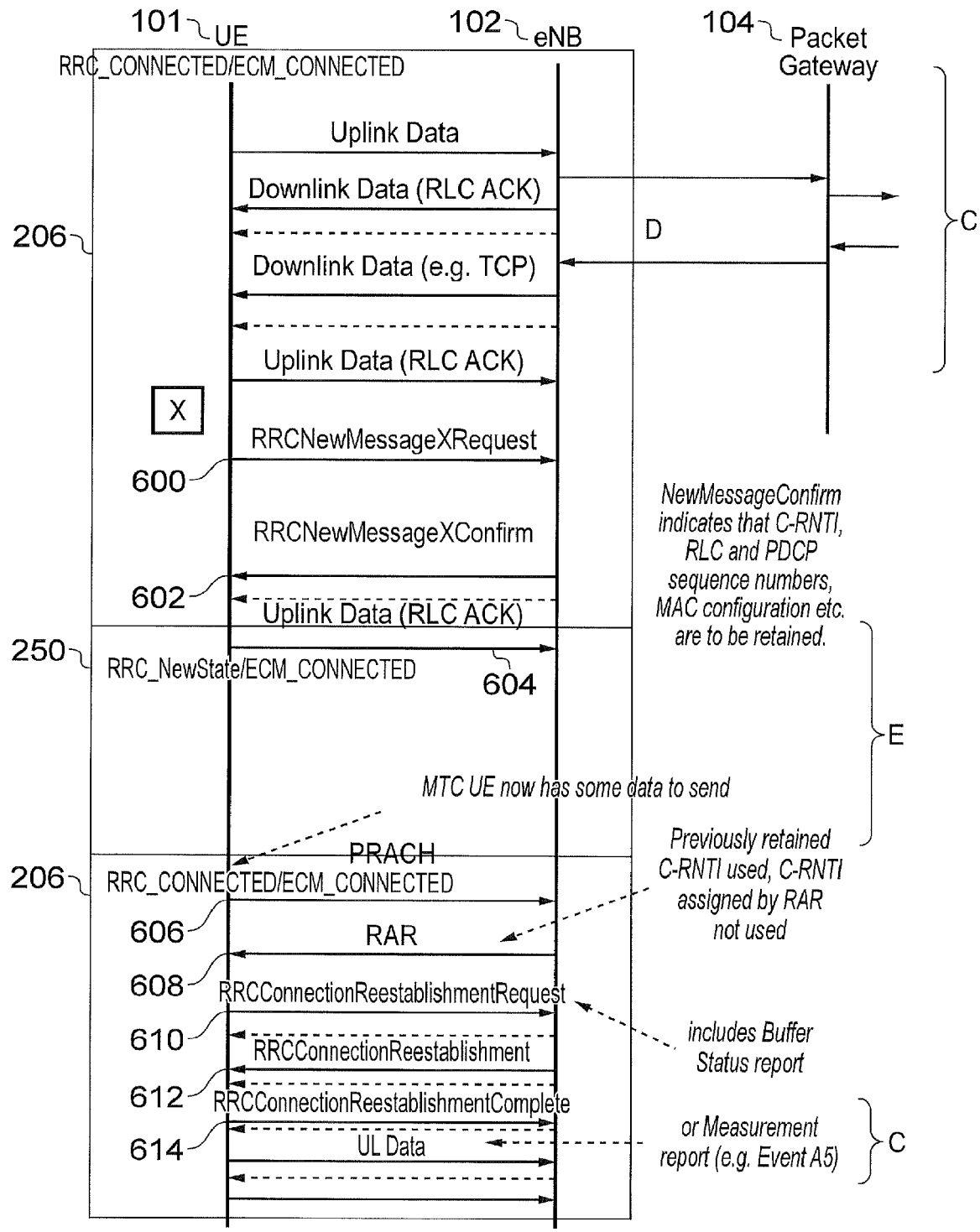
FIG. 12 is a call flow diagram illustrating an exchange of messages which includes the operation of a communications device which enters a stasis state in accordance with the present technique.

A call flow diagram corresponding to the core flow diagrams shown in FIGS. 9a and 9b but adapted in accordance with the present technique to include the call flow messages associated with a transition to the stasis state 250 is shown in FIG. 12. FIG. 12 is now summarised as follows:

Starting from the RRC connected/ECM connected state 206 the communications device 101 transmits data packets on the uplink and receives acknowledgment on the downlink or receives downlink data packets and transmits acknowledgements on the uplink as explained with reference to FIGS. 5, 9a and 9b. This effective therefore forms part of section C of the flow diagram of FIG. 5. At point X in FIG. 12 the communications device 101 detects that it has no more data packets to transmit and transmits an RRC stasis message request 600. If the communications network can support the new stasis state then the communications network transmits an RRC stasis message confirm message to the communications device 101 as message 602. At this point both the communications device and the eNode-B confirm that the CRNTI the RLC and PDCP sequence numbers and the MAC configuration etc. are to be retained and stored so that effectively the EPC bearer moves into a stasis state in that it still exists but there are no packets being transmitted via the EPS bearer.

Accordingly, when the communications terminal transmits data packets again via the EPS bearer there is no need to re-establish the tunnelling between the various nodes of the communications network in order to establish the EPS bearer. The communications device 101 then transmits a RRC stasis ECM connected message 604 to the eNodeB to confirm that it has entered the stasis state. Therefore in a period E the communications device has entered the stasis state 250.

Whilst in the stasis state 250 the communications device detects that it needs to move back to the RRC connected and ECM connected state 206. This can be to transmit data from the uplink because the communications device detects that it has new packet data to be transmitted. Alternatively the network may detect that it may need to transmit on the downlink and therefore signals to the communications device using a conventional paging message that it needs to move back to the RRC connect and ECM connected states. Alternatively, the communications terminal which continues to monitor neighbouring base stations and may decide that it needs to hand over to one of the neighbouring base stations as a result of measurement of radio link quality being taken in accordance with a conventional handover arrangement.

Again, this would require the communications device 101 to move back to the RRC connected/ECM connected state 206. In order for the communications device 101 to move back to the ECM connected/RRC connected state 206, the communications device transits a PRACH message. The communications device receives but then discards the C-RNTI assigned via the RAR message 608 and uses the retained C-RNTI. The C-RNTI which was retained should not be used by any other communications device. Accordingly the eNodeB 102 reserves the C-RNTI for the communications device during a time when the communications device is in the stasis state so that this is not allocated to another communications device in the cell. The RRC connection request re-establishment request message 610 sent by the communications terminal 101 includes the retained C-RNTI. The RRC connection re-establishment request message may include an indication of a status of the packet communications buffer stasis. The eNode-B 102 then transmits and RRC connection re-establishment message 612 to the communications device 101 which responds with an RRC connection re-establishment complete message 614. At this point the communications device has returned to the RRC connected/ECM connected state 206 and transmits data on the uplink in accordance with a conventional operation identified as a phase C shown in FIG. 5 and also in the first part of FIG. 12.

As will be appreciated by transitioning to the stasis state the communications terminal can release its radio communications resources and enter a power down state thus saving power. However, if there is new data to be transmitted communications device does not have to proceed through the entire message exchange shown in FIGS. 9a and 9b in order to communicate packet data again. This is because the stats of the protocol stacks are retained for example the RLC layer and PDCP sequence numbers are maintained as well as the MAC configuration for the communications link. In addition on the network side the EPS bearer is also retained and just needs to be reactivated by transmitting data packets in a conventional arrangement. Accordingly, it is possible to reduce network resources consumed the result of signalling and reduce an amount of redundant information which is communicated in order to establish the EPS bearer.

Figure 13:
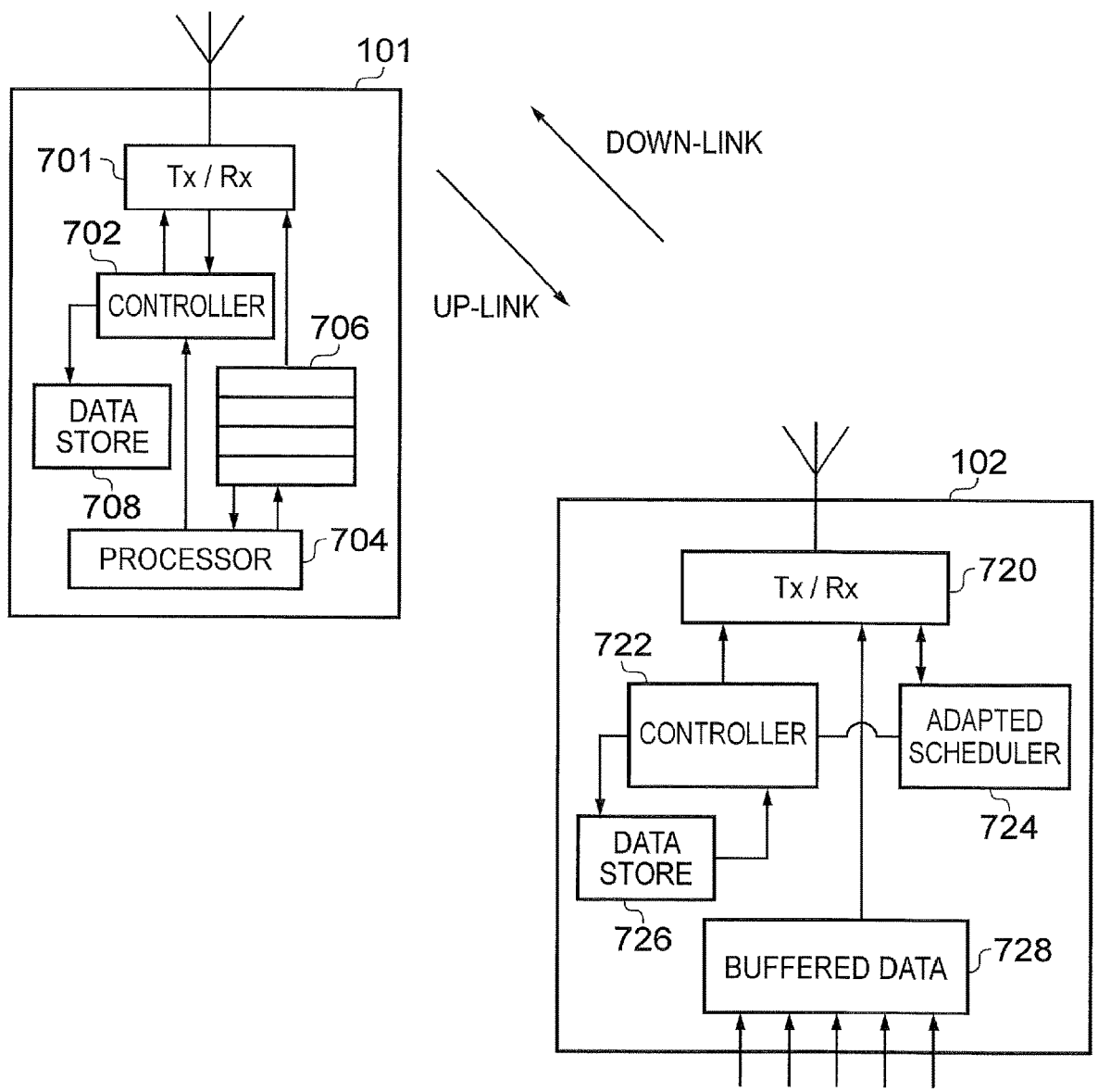
FIG. 13 provides a schematic block diagram of a communications device and a base station configured in accordance with an example of the present disclosure.

A diagram of an adapted communications device 101 and eNodeB 102 which provides an example embodiment of the present technique is shown in FIG. 13.

As shown in FIG. 13, a communications device also referred to as a UE 101 comprises a transmitter and receiver unit 701 and a controller 702. The controller 702 controls the transceiver unit 701 in order to transmit and receive data which is fed to a processor 704 which hosts applications programs and other processes for providing user services and for controlling the communications device 101. Data transmitted on the down-link and received for transmission on the up-link by the communications device 101 is fed to a data buffer 706. The data buffer 706 buffers the data packets for transmission on the uplink to the mobile communications network or buffers data packets received on the downlink which are transmitted from and the eNodeB 102 to the communications device 101. As explained above when the communications device enters the stasis state, the state of the protocol stacks including sequence numbers, security keys etc are stored in a data store 708 with a channel identifier such as a C-RNTI. This information, which is related to the communications context of the communications device can be used to reactivate the communications context of the communications device 101 which has been used to transmit data packets on the uplink or receive data packets on the downlink via the EPS bearer across the mobile communications network, which is associated with the communications context.

Also shown in FIG. 13 is a base station or eNodeB 102, which comprises a transmitter and receiver unit 720 and a controller at 722. An adapted schedulers 724 is used to schedule the allocation of uplink and downlink communications resources in accordance with a conventional operation. However in combination with controller 722, when a stasis state message is received from a communications device 701, the controller 722 arranges for the corresponding state of the protocol stack associated with the EPS bearer establish for the communications device to be stored in a data store 726. The communications buffer 728 is provided to buffer data packets received from respective EPS bearers for transmission to communications devices within a cell served by the eNodeB 182. Therefore, as explained above, once a stasis state message is detected by the controller 722, a scheduler 724 releases communications resources allocated to communications terminal 101 which has entered the stasis state and the controller 722 stores the state of the protocol stack including sequence numbers and security keys. The controller 722 then arranges to transmit a message to the communications channel 101 indicating a time for which the communications Tamil will remain within the stasis state.

Summary Aspects of the Stasis State

Embodiments of the present technique can provide new RRC state and the provision of an efficient signalling procedure for the rapid transition between the new state and RRC_CONNECTED. The new state differs from existing LTE RRC states (see TS 36.300 Section 7.2) in that
- the RRC context is suspended (i.e. it is dormant) until reactivated by the UE
- the UE is not contactable
- the RRC context is reactivated via the RACH procedure and re-establishment of the RRC connection
- network controlled handover is only possible as a result of UE triggered activity related to measurements performed in the new state The UE must reactivate its RRC context (via the RACH procedure and re-establishment of the RRC connection, to change the state to RRC_CONNECTED) in order to transmit data. A UE may deactivate its RRC context via RRC signalling when RRC_CONNECTED. In this new stasis state:
- The communication context in the UE and E-UTRAN is maintained;
- the C_RNTI is maintained
- the UE remains PMM_CONNECTED
- RLC and PDCP Sequence Numbers are preserved
- The MAC configuration is preserved
- the security context is maintained (security keys/sequence numbers are preserved in order to enable ciphering an integrity protection)
- E-UTRAN knows the cell which the UE belongs to;
- Network ability to transmit and/or receive data to/from the UE is suspended;
- the UE's ability to transmit and/or receive data to/from network is suspended
- Any dedicated radio resources previously assigned to the UE (e.g. PUCCH) are released
- The UE performs neighbour cell intra-frequency measurements according to the intra frequency neighbour list previously provided (excluding blacklisted cells)
- Event Reporting is triggered (Event A5) if $S_{rxlev}$ falls below quality threshold1 and a neighbour cell is found which is better than thtreshold2
- UE triggers signalling to initiate transition to RRC_CONNECTED when it has data to send or needs to provide a measurement report or expects to receive data (according to information provided by higher layers)
- The Network (i.e. eNB) may buffer any DL data and/or NAS messages and may attempt to deliver on transition to RRC-CONNECTED
- Network controlled mobility (handover), the network's ability to transmit and/or receive data to/from the UE and the UE's ability to transmit and/or receive data to/from the network is restored on transition to RRC_CONECTED.
- In RRC_CONNECTED/PMM_CONNECTED the UE may send stasis state message when it has no data to send and does not expect to receive any data (X in FIG. 12). In RRC_CONNECTED/PMM_CONNECTED, receipt of stasis state message causes the eNodeB to preserve the UE's current communications context and to maintain the UE's packet tunnel between the eNB and Packet Gateway.
- The MAC configuration, PDCP and RLC states, including sequence numbers and security context (sequence numbers and keys related to ciphering an integrity protection) are then maintained by the eNodeB and UE.
- In RRC_CONNECTED/PMM_CONNECTED, the eNodeB may respond to receipt of stasis state message by sending stasis state eject message to the UE if it does not wish to preserve the UE's current RRC context (as identified by the C-RNTI).
- The eNodeB may send a RRC stasis state confirm message in response to the received stasis state message in order to indicate that the UE's RRC context is suspended/dormant and RRCNewMessageXConfirm will include an Information Element providing timer value $T_{NewState}$, where $T_{NewState}$ indicating the period of time for which the communication context is maintained. The value of $T_{NewState}$ may be configured by the network operator and is would have a value of several hours. While $T_{NewStat}\neq 0$, the communication context is maintained; the eNB does not rassign the C-RNTI to any other UE and preserves current RLC and PDCP sequence numbers, MAC configuration and security related information and packet tunnel between the eNB and Packet Gateway). Whenever $T_{NewStat}\leq 0$ then the eNB may end the commications context (i.e. it may delete it from its memor). If the communication context is ended then the eNB no longer has any knoweldege relating to the UE and may reassign the C-RNTI.
- If stasis state confirm message is received in response to stasis state message sent then the UE enters RRC-stasis state (step E area of FIG. 12). The UE is moved to RRC_stasis state only when it receives RRC stasis state confirm message. If it receives a RRC stasis state reject message or if it does not receive any response to the stasis state message then it remains in the state RRC_CONNECTED.
- The support of the RRC stasis state is assumed to be optional in the UE and in the network. If the eNodeB does not support RRC_stasis state then the eNodeB will ignore/discard the RRC stasis state message request and will not respond to it. If the eNodeB is unable to maintain the communications context (e.g. due to processing or memory limitations) then it should send RRC stasis state Reject message in response to a received RRC stasis state Request.
- In RRC_stasis state, the UE continues to monitor its current cell and it may continue to use the intra frequency neighbor list and cell blacklist, provided in RRC_CONNECTED.
- If $S_{rxlev}$ (current cell)<threshold1 then the UE attempts to find a cell in its neighbour list which is not in its blacklist and for which $S_{rxlev}$ (new cell)>threshold2 (threshold1 and threshold2 are assumed to be operator defined and may be stored in the USIM). If these conditions are met then this triggers sending of an Even Report (Event A5) to the eNodeB.
- If $T_{NewState}$ expires then the UE moves to RRC_IDLE.
- If the UE has data in its output buffer (buffer status report, application layer data, triggered event report etc.) then it follows the Random Access Procedure specified for LTE (see section 5.1 of 36.321) in order to obtain a Timing Advance and an UL Grant. The UE discards the C-RNTI provided by the Random Access Response (see Section 5.1.5 of 36.321) and then proceeds to re-establish the RRC connection (according to Section 5.3.7.4 of TS 36.331).

In some examples applications in terminal devices (laptops etc.) initiate communication session establishment with servers and servers do not generally initiate session establishment with terminal devices. Embodiments can therefore provide a means of improving utilisation of the use of radio resources in the case where the mobile device (the UE) initiates session establishment with some remote server and has information governing sending/receiving of data to/from the server. The disclosure provides a means to enable a UE which occasionally wishes to transmit to or receive small amounts of data to maximise sleep mode (i.e. to shut down most of its radio processes). Radio processes are switched off when the UE has no data to send and does not expect to receive any data. In RRC_NewState most radio processes are switched off while the UEs transmit buffer is empty then
   the UE monitors only its current cell
      if the received signal level $S_{rxlev}$ falls below threshold1 then
         it tries to find a neighbour cell which is not an the blacklist and which has a signal level above threshold2
         if suitable is found then this triggers sending an Event Report (so Event Report A5 is placed in the UE's transmit buffer)

If the UEs transmit buffer is not empty for a certain time or contains more than a certain number of bytes then radio processes are switched back on and the UE performs the RACH procedure (according to Section 5.1 of 36.321) and obtains a Timing Advance to resynchronize with the eNB and an UL Grant in order to commence transmission of buffered data (the UE continues to reuse the C-TNTI previously assigned, before transition to RRC_stasis state—according to Section 5.1.5 of 36.321)

The disclosure has been described with reference to LTE, but may also be applicable in other wireless communication systems, such as UMTS, as well as in both FDD and TDD systems. The disclosure can be applied regardless of whether or not DRX functionality is supported, and DRX functionality provides opportunities to optimise sleep during periods of data transmission/reception but is not optimal during long period of inactivity (e.g. several minutes).

Advantages provided by the present technique may depend on the frequency of the occasional data transmissions (e.g. every minute, every 5 minutes) and amount of data to be transmitted. For example: Greater power saving might be achieved if the UE waited until some threshold is reached—buffer is not empty for a certain time and/or reaches a certain occupancy (numbers of bytes stored).

The disclosure can find application MTC devices, e.g. smart metering, where the UE is stationary and may want to send small amounts of data (e.g. 100 bytes) every few minutes, every few hours, once per day.

Various further aspects and features of the present invention are defined in the appended claims. As will be appreciated although the example of an LTE communications system has been used to illustrate examples of the present technique, the present disclosure fined equal application with other communications systems. Thus although the state ECM connected and EMM connected have been used, other communications systems use the term PMM connected to represent a packet mobility management system which corresponds substantially to the ECM/EMM terminology used in the present disclosure.

Various further aspects and features of the present disclosure are defined in the appended claims. Various combinations of the features of the dependent claims may be made with those of the independent claims other than the specific combinations recited for the claim dependency. Embodiments of the present disclosure have been defined largely in terms of reduced capability devices transmitting data via a virtual carrier inserted in a conventional LTE based host carrier. However, it will be understood that any suitable device can transmit and receive data for example devices which have the same capability as a conventional LTE type device or devices which have enhanced capabilities.

The following numbered clauses provide further example aspects and features of the present technique:

1. A communications device for transmitting data to and receiving data from a mobile communications network, the mobile communications network including one or more network elements providing a wireless access interface for communicating with the communications device, the communications device comprising:

a transmitter unit configured to transmit signals to the mobile communications network via the wireless access interface provided by the one or more network elements of the mobile communications network, and a receiver unit configured to receive signals from the mobile communications network via the wireless access interface provided by the one or more network elements of the mobile communications network, and a controller configured to control the transmitter unit to transmit one or more signalling messages to the communications network and the receiver unit to receive one or more signalling messages from the communications network to establish a communications context for communicating data packets using a packet communications bearer from the communications device via the mobile communications network, wherein the controller is configured to identify that the communications device can enter a stasis state because no data packets are available for transmission for a predetermined time via the packet communications bearer or there are no data packets to receive via the packet communications bearer, to transmit a stasis state message to the mobile communications network, and to store information relating to the communications context associated with the packet communications bearer in a data store, which stored information can be used by the controller using the transmitter unit and the receiver unit to re-establish the packet communications bearer to transmit and/or receive data packets using the packet communications bearer, the communications device thereby entering the stasis state.

2. A communications device according to clause 1, wherein the controller is configured upon detecting that the communications device can enter the stasis state to store, with the information relating to the communications context, a network terminal identifier provided to the communications device by the mobile communications network for requesting communications resources when the communications context was established, and upon detecting that the communications device should exit from the stasis state and enter a connected state, the controller is configured with the transmitter to transmit a request to re-connect message to the mobile communications network, the request to connect message including the network terminal identifier, which is recognised by the mobile communications network to re-establish the packet communications bearer.

3. A communications device according to clause 1 or 2, wherein the controller is configured to store in the data store one or more sequence numbers associated with one or more protocols of a protocol stack which forms the packet communications bearer when entering the stasis state to the effect that, when the communications device moves from the stasis state to the connected state the stored sequence numbers can be restored to the one or more protocols of the protocol stack to transmit or receive signals via the wireless access interface.

4. A communications device according to clause 3, wherein the information relating to the context which is stored by the controller in the data store includes one or more of a sequence number associated with a radio link control protocol, a packet data communications protocol or a configuration of a medium access control layer.

5. A communications device according to clause 3 or 4, wherein the information relating to the context which is stored by the controller in the data store includes a sequence number and a cyphering key associated with a sequence context.

6. A communications device according to any of clauses 1, 2 or 3, wherein the controller in combination with the receiver monitors signals received via the wireless access interface to perform measurements and in accordance with predetermined conditions based on the measurements, the controller in combination with the receiver and the transmitter is configured to re-establish the same packet communications bearer.

7. A communications device according to clause 6, wherein the measurements performed by the controller determine whether the communications device should handover from a base station to which the communications device is attached to another base station to transmit and/or receive data packets via the same packet communications bearer, the communications device thereby entering the connected state from the stasis state.

8. A method of transmitting data to and/or receiving data from a mobile communications network from a communications device, the mobile communications network including one or more network elements providing a wireless access interface for communicating with the communications device, the method comprising:
  transmitting one or more signalling messages to the mobile communications network, and
  receiving one or more signalling messages from the communications network to establish a communications context for communicating data packets using a packet communications bearer from the communications device via the mobile communications network,
  identifying that the communications device can enter a stasis state because no data packets are available for transmission for a predetermined time via the packet communications bearer or there are no data packets to receive via the packet communications bearer,
  transmitting a stasis state message to the mobile communications network, and
  storing information relating to the communications context associated with the packet communications bearer in a data store, which stored information can be used by the controller using the transmitter unit and the receiver unit to re-establish the packet communications bearer to transmit and/or receive data packets using the packet communications bearer, the communications device thereby entering the stasis state.

9. A method according to clause 8, the storing information relating to the communications context associated with the packet communications bearer in a data store, comprises
  storing, with the information relating to the communications context, a network terminal identifier provided to the communications device by the mobile communications network for requesting communications resources when the communications context was established, and
  upon detecting that the communications device should exit from the stasis state and enter a connected state, transmitting a request to re-connect message to the mobile communications network, the request to connect message including the network terminal identifier, which is recognised by the mobile communications network to re-establish the packet communications bearer.

10. A method according to clause 8 or 9, wherein the storing information relating to the communications context associated with the packet communications bearer in a data store, comprises
  storing in the data store one or more sequence numbers associated with one or more protocols of a protocol stack which forms the packet communications bearer when entering the stasis state to the effect that, when the communications device moves from the stasis state to the connected state the stored sequence numbers can be restored to the one or more protocols of the protocol stack to transmit or receive signals via the wireless access interface.

The invention claimed is:

1. A communications device for transmitting data to and receiving data from a mobile communications network, the mobile communications network including one or more network elements providing a wireless access interface for communicating with the communications device, the communications device comprising:
  circuitry configured to
    transmit signals to the mobile communications network via the wireless access interface provided by the one or more network elements of the mobile communications network;
    receive signals from the mobile communications network via the wireless access interface provided by the one or more network elements of the mobile communications network;
    control transmission of one or more signalling messages to the mobile communications network;
    control reception of one or more signalling messages from the mobile communications network to establish a communications context for communicating data packets using a packet communications bearer from the communications device via the mobile communications network;
    identify that the communications device has entered a stasis state;
    store an identifier and information relating to the communications context associated with the packet communications bearer in a memory, wherein the identifier is specific to the communication context, assigned to the communication context after the communications context has been established, and is provided to the communications device by the mobile communications network; and
    transmit a request to re-connect message to the mobile communications network, the request to re-connect message including the identifier for recognition by the mobile communications network to re-establish the packet communications bearer upon detecting that the communications device will exit from the stasis state and enter a connected state.

2. The communications device of claim 1, wherein
the circuitry is configured to store in the memory one or more sequence numbers associated with one or more protocols of a protocol stack which forms the packet communications bearer when entering the stasis state to allow the stored sequence numbers to be restored or reestablish the packet communications bearer to the one or more protocols of the protocol stack to transmit or receive signals via the wireless access interface, when the communications device moves from the stasis state to the connected state.

3. The communications device of claim 2, wherein the information relating to the context which is stored by the circuitry in the memory includes one or more of a sequence number associated with a radio link control protocol, a packet data communications protocol or a configuration of a medium access control layer.

4. The communications device of claim 2, wherein the information relating to the context which is stored by the circuitry in the memory includes a sequence number and a cyphering key associated with a sequence context.

5. The communications device of claim 1, wherein the circuitry is configured to:
monitor signals received via the wireless access interface to perform measurements and in accordance with pre-determined conditions based on the measurements; and
re-establish the packet communications bearer upon detecting that the communications device will exit from the stasis state and enter the connected state.

6. The communications device of claim 5, wherein the measurements performed by the circuitry determine whether the communications device will handover from a base station to which the communications device is attached to another base station to at least one of transmit or receive data packets via the packet communications bearer, the communications device thereby entering the connected state from the stasis state.

7. The communications device of claim 1, wherein the circuitry is configured to re-establish the packet communications bearer using the information relating to the communications context associated with the packet communications bearer in memory upon detecting that the communications device will exit from the stasis state and enter the connected state.

8. The communications device of claim 1, wherein the circuitry is configured to:
receive a message from the mobile communications network in response to the request to re-connect message confirming that the packet communication bearer has been re-established with the mobile communication network; and
enter the connected state by re-establishing the packet communications bearer with the mobile communications network.

9. The communications device of claim 1, wherein the circuitry is configured to:
receive a message from the mobile communications network indicating that the communication context is not valid in response to the request to re-connect message;
discard the identifier and information relating to the communications context associated with the packet communications bearer stored in the memory; and
initiate process to reconnect with the mobile communications network by transmitting a radio resource connection (RRC) setup message to the mobile communications network.

10. The communications device of claim 1, wherein the circuitry is configured to:
receive a message from the mobile communications network in response to the request to re-connect message indicating that the communication context has been discarded by the mobile communications network; and
initiate a process to reconnect with the mobile communications network by transmitting a radio resource connection (RRC) setup message to the mobile communications network.

11. The communications device of claim 1, wherein the circuitry is configured to:
receive a response message from the mobile communications network in response to the request to re-connect message instructing the communications device to enter a stasis state; and
control the communications device to transition to the stasis state upon receiving the response message from the mobile communications network.

12. The communications device of claim 11, wherein the circuitry is configured to:
discard the identifier and information relating to the communications context associated with the packet communications bearer stored in the memory after transitioning to the stasis state; and
initiate a process to reconnect with the mobile communications network by transmitting a radio resource connection (RRC) setup message to the mobile communications network.

13. The communications device of claim 1, wherein the circuitry is configured to:
receive a response message from the mobile communications network in response to the request to re-connect message instructing the communications device to enter an inactive state; and
control the communications device to transition to the inactive state upon receiving the response message from the mobile communications network.

14. The communications device of claim 13, wherein the circuitry is configured to:
discard the identifier and information relating to the communications context associated with the packet communications bearer stored in the memory after transitioning to the inactive state; and
initiate process to reconnect with the mobile communications network by transmitting a radio resource connection (RRC) setup message to the mobile communications network.

15. A method of transmitting data to and receiving data from a mobile communications network from a communications device, the mobile communications network including one or more network elements providing a wireless access interface for communicating with the communications device, the method comprising:
transmitting, with circuitry, one or more signalling messages to the mobile communications network;
receiving, with the circuitry, one or more signalling messages from the mobile communications network to establish a communications context for communicating data packets using a packet communications bearer from the communications device via the mobile communications network;
identifying, with the circuitry, that the communications device has entered a stasis state;
storing, with the circuitry, an identifier and information relating to the communications context associated with the packet communications bearer in a memory, wherein the identifier is specific to the communication context, assigned to the communication context after the communications context has been established, and is provided to the communications device by the mobile communications network; and transmitting, with the circuitry, a request to re-connect message to the mobile communications network, the request to re-connect message including the identifier for recognition by the mobile communications network to re-establish the packet communications bearer upon detecting that the communications device will exit from the stasis state and enter a connected state.

16. The method of claim 15, wherein the storing comprises:
storing, by the circuitry and in the memory, one or more sequence numbers associated with one or more protocols of a protocol stack which forms the packet communications bearer when entering the stasis state to the effect that, when the communications device moves from the stasis state to the connected state the stored sequence numbers can be restored to the one or more protocols of the protocol stack to transmit or receive signals via the wireless access interface.

17. The method of claim 15, further comprising:
re-establishing, by the circuitry, the packet communications bearer using the information relating to the communications context associated with the packet communications bearer in memory upon detecting that the communications device will exit from the stasis state and enter the connected state.

18. The method of claim 15, wherein
the information relating to the context which is stored by the memory includes sequence number and a cyphering key associated with a sequence context.

19. The method of claim 15, further comprising:
monitoring, by the circuitry, signals received via the wireless access interface to perform measurements and in accordance with predetermined conditions based on the measurements; and
re-establishing, by the circuitry, the packet communications bearer upon detecting that the communications device will exit from the stasis state and enter the connected state.

20. The method of claim 19, wherein
the measurements performed by the circuitry determine whether the communications device will handover from a base station to which the communications device is attached to another base station to at least one of transmit or receive data packets via the packet communications bearer, the communications device thereby entering the connected state from the stasis state.

21. A communications device for transmitting data to and receiving data from a mobile communications network, the mobile communications network including one or more network elements providing a wireless access interface for communicating with the communications device, the communications device comprising:
circuitry configured to
transmit signals to the mobile communications network via the wireless access interface provided by the one or more network elements of the mobile communications network;
receive signals from the mobile communications network via the wireless access interface provided by the one or more network elements of the mobile communications network;
control transmission of one or more signalling messages to the mobile communications network;
control reception of one or more signalling messages from the mobile communications network to establish a communications context for communicating data packets using a packet communications bearer from the communications device via the mobile communications network;
store an identifier and information relating to the communications context associated with the packet communications bearer in a memory, wherein the identifier is specific to the communication context, assigned to the communication context after the communications context has been established, and is provided to the communications device by the mobile communications network;
identify that the communications device is in a stasis state;
detect that the communications device will transition from the stasis state to a connected state; and
transmit a connection request message to the mobile communications network, the connection request message including the identifier for recognition by the mobile communications network to re-establish the packet communications bearer upon detecting that the communications device will transition from the stasis state to the connected state.

22. The communications device of claim 21, wherein
the circuitry is configured to re-establish the packet communications bearer using the information relating to the communications context associated with the packet communications bearer in memory upon detecting that the communications device will transition from the stasis state to the connected state.

* * * * *